(12) United States Patent
Tsutsui

(10) Patent No.: US 12,480,756 B2
(45) Date of Patent: Nov. 25, 2025

(54) VIRTUAL METROLOGY APPARATUS, VIRTUAL METROLOGY METHOD, AND VIRTUAL METROLOGY PROGRAM

(71) Applicant: Tokyo Electron Limited, Tokyo (JP)

(72) Inventor: Takuro Tsutsui, Hokkaido (JP)

(73) Assignee: Tokyo Electron Limited, Tokyo (JP)

( * ) Notice: Subject to any disclaimer, the term of this patent is extended or adjusted under 35 U.S.C. 154(b) by 529 days.

(21) Appl. No.: 17/294,509

(22) PCT Filed: Nov. 29, 2019

(86) PCT No.: PCT/JP2019/046869
§ 371 (c)(1),
(2) Date: May 17, 2021

(87) PCT Pub. No.: WO2020/111258
PCT Pub. Date: Jun. 4, 2020

(65) Prior Publication Data
US 2022/0011747 A1  Jan. 13, 2022

(30) Foreign Application Priority Data
Nov. 30, 2018 (JP) .................................. 2018-225676

(51) Int. Cl.
G01B 11/00 (2006.01)
G01B 11/06 (2006.01)
(Continued)

(52) U.S. Cl.
CPC .......... *G01B 11/00* (2013.01); *G01B 11/0658* (2013.01); *G06N 3/08* (2013.01);
(Continued)

(58) Field of Classification Search
CPC ...... G05B 19/4155; G05B 2219/45031; G05B 19/4183; G05B 23/0221; G05B 19/418;
(Continued)

(56) References Cited

U.S. PATENT DOCUMENTS

2012/0185813 A1\* 7/2012 Kaushal ............ H01J 37/32926
716/112
2015/0332167 A1\* 11/2015 Kaushal ............... G05B 19/418
706/12
(Continued)

FOREIGN PATENT DOCUMENTS

CN 101622688 1/2010
JP H06-037021 2/1994
(Continued)

OTHER PUBLICATIONS

M. Maggipinto, M. Terzi, C. Masiero, A. Beghi and G. A. Susto, "A Computer Vision-Inspired Deep Learning Architecture for Virtual Metrology Modeling With 2-Dimensional Data," in IEEE Transactions on Semiconductor Manufacturing, vol. 31, No. 3, pp. 376-384 (Year: 2018).\*

*Primary Examiner* — Eric J Yoon
(74) *Attorney, Agent, or Firm* — IPUSA, PLLC

(57) ABSTRACT

A virtual metrology apparatus, a virtual metrology method, and a virtual metrology program that allow a highly accurate virtual metrology process to be performed is provided. A virtual metrology apparatus includes an acquisition unit configured to acquire a time series data group measured in association with processing of a target object in a predetermined processing unit of a manufacturing process, and a training unit configured to train a plurality of network sections by machine learning such that a result of consolidating output data produced by the plurality of network sections processing the acquired time series data group approaches inspection data of a resultant object obtained upon processing the target object in the predetermined processing unit of the manufacturing process.

18 Claims, 22 Drawing Sheets

(51) Int. Cl.
  *G06N 3/08* (2023.01)
  *G06N 20/00* (2019.01)
  G05B 19/4155 (2006.01)
  G06N 5/04 (2023.01)

(52) U.S. Cl.
  CPC .......... *G06N 20/00* (2019.01); *G01B 11/0633* (2013.01); *G05B 19/4155* (2013.01); *G05B 2219/45031* (2013.01); *G06N 5/04* (2013.01)

(58) Field of Classification Search
  CPC ...... G05B 23/0243; G06N 20/00; G06N 5/04; G06N 3/08; G06N 3/045; G01B 11/00; G01B 11/0658; G01B 11/0633; H01L 21/02; H01L 21/67276
  See application file for complete search history.

(56) References Cited

U.S. PATENT DOCUMENTS

| | | | | |
|---|---|---|---|---|
| 2018/0358271 | A1* | 12/2018 | David | G03F 7/70633 |
| 2019/0114544 | A1* | 4/2019 | Sundaram | G06F 18/2155 |
| 2019/0244366 | A1* | 8/2019 | Yu | G06T 7/254 |
| 2020/0110852 | A1* | 4/2020 | Banna | G06F 30/39 |

FOREIGN PATENT DOCUMENTS

| | | |
|---|---|---|
| JP | 2009-282960 | 12/2009 |
| JP | 2010-267242 | 11/2010 |
| WO | 2012/073289 | 6/2012 |
| WO | 2018/101722 | 6/2018 |

* cited by examiner

FIG.2
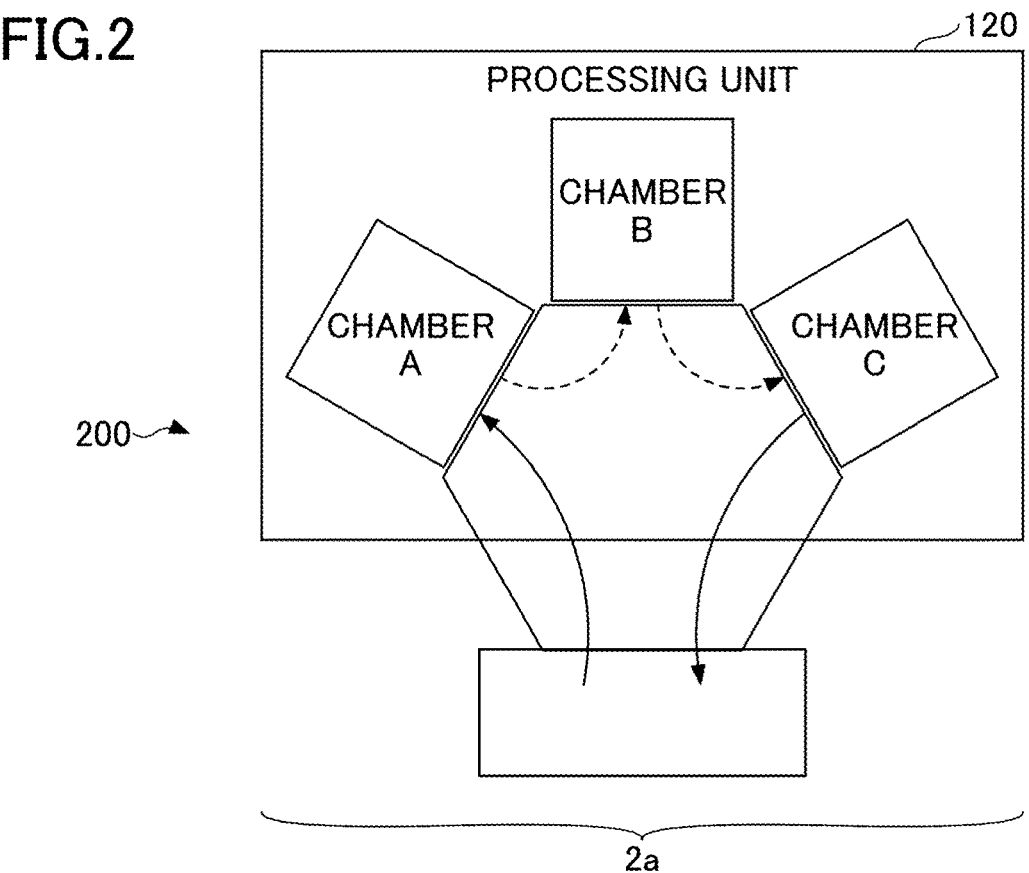
2a
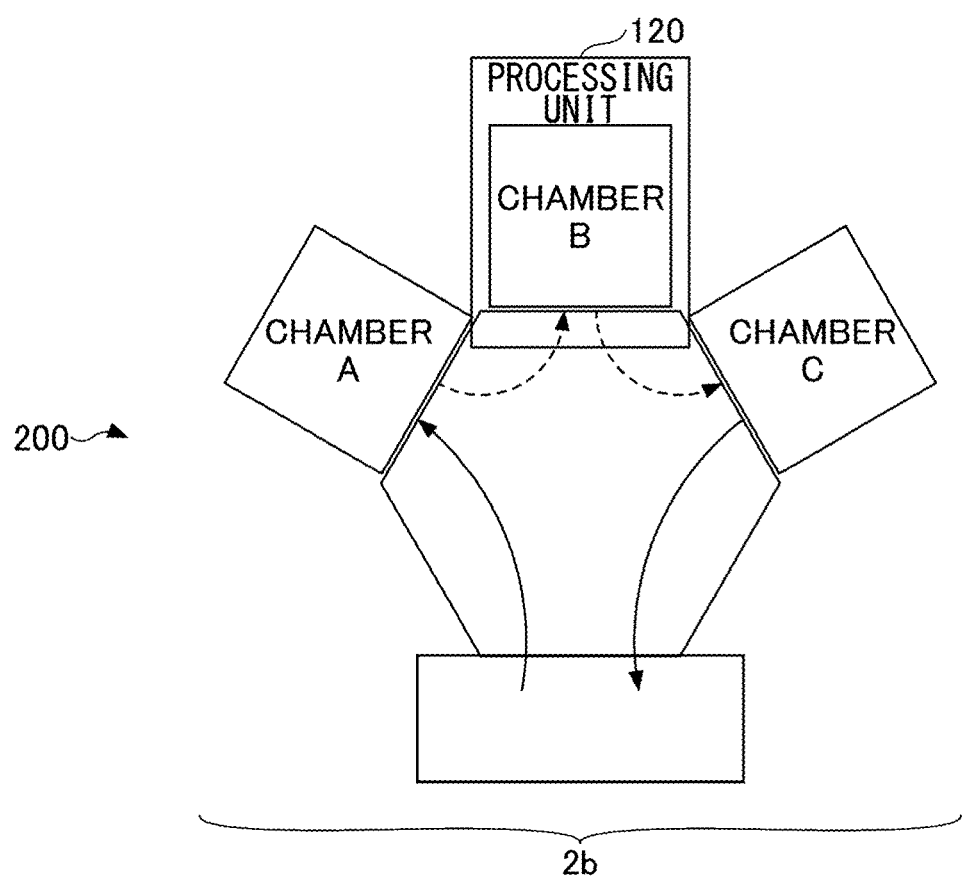
2b

FIG.9
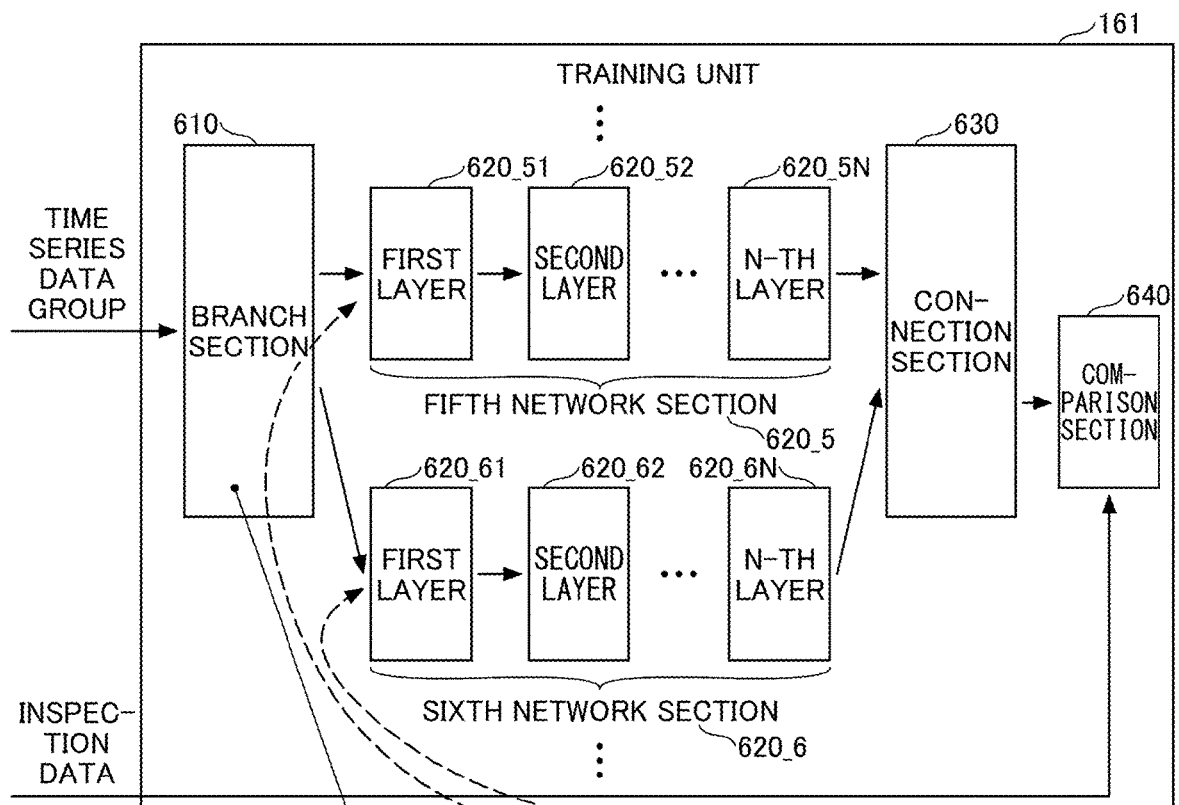
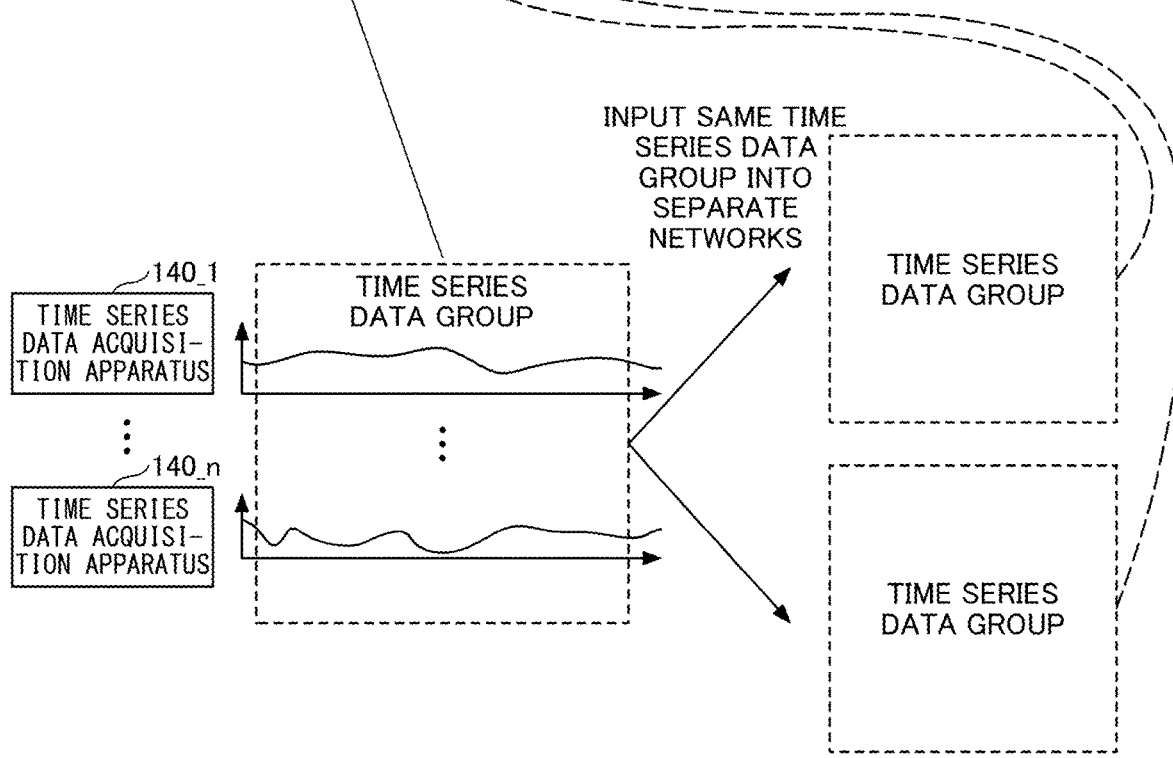

FIG.11
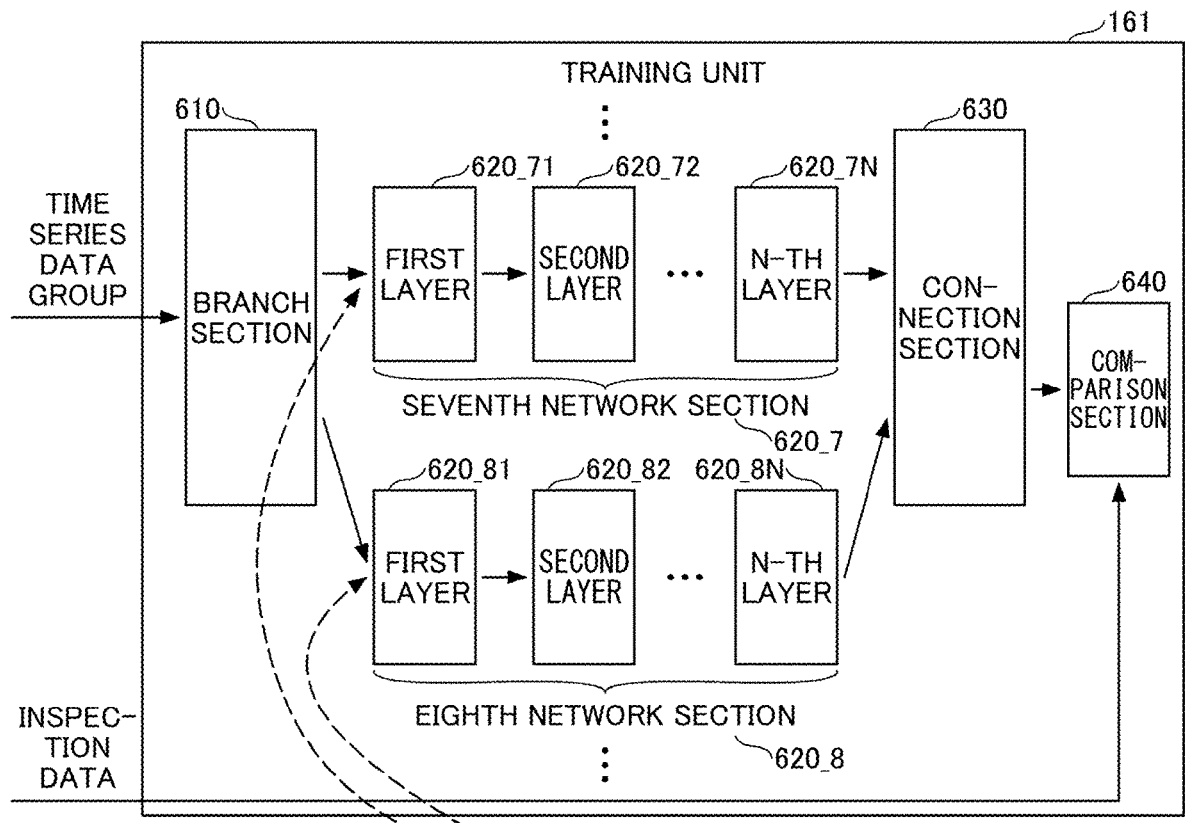
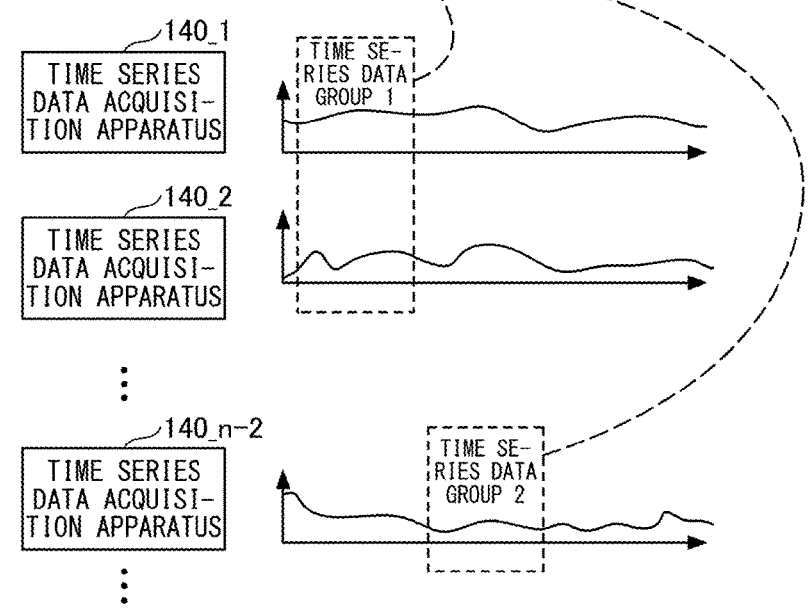

FIG.21
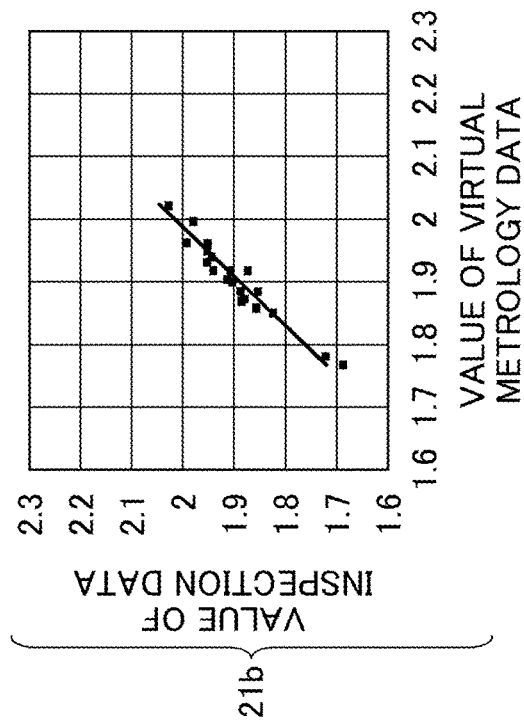
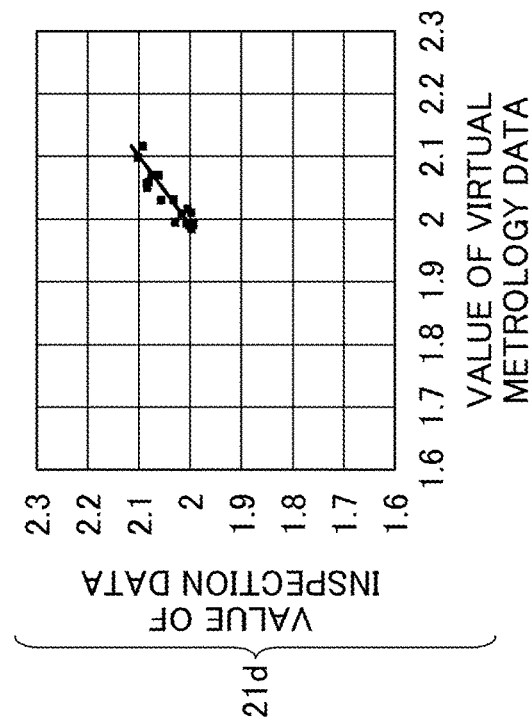
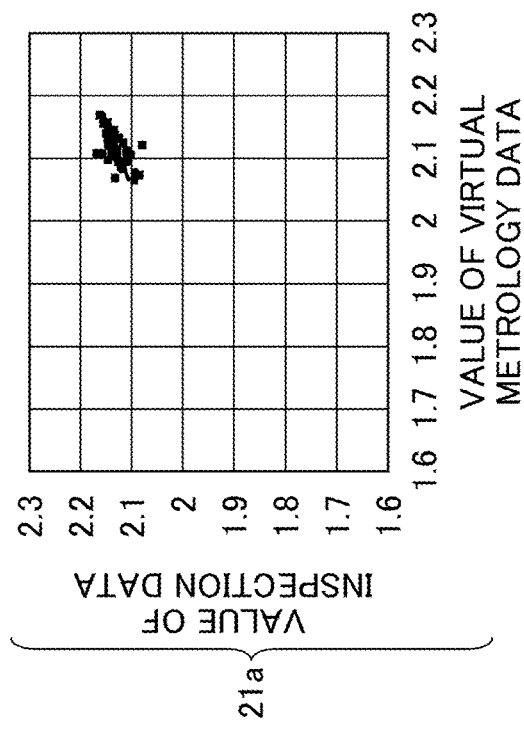
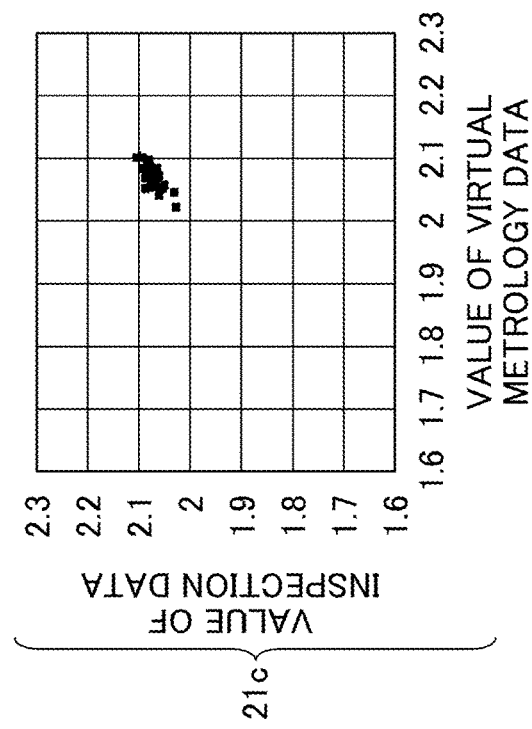

|  |  | NORMAL CNN | INFERENCE UNIT 162 |
|---|---|---|---|
| $R^2$ | ALL | 0.799 | 0.953 |
|  | PM A | 0.097 | 0.334 |
|  | PM B | 0.841 | 0.927 |
|  | PM C | 0 | 0.452 |
|  | PM D | 0.235 | 0.849 |
| MAPE | ALL | 1.6879 | 0.754 |
|  | PM A | 1.938 | 0.8892 |
|  | PM B | 1.4772 | 1.0433 |
|  | PM C | 1.1396 | 0.4731 |
|  | PM D | 2.1796 | 0.595 |

# VIRTUAL METROLOGY APPARATUS, VIRTUAL METROLOGY METHOD, AND VIRTUAL METROLOGY PROGRAM

TECHNICAL FIELD

The disclosures herein relate to a virtual metrology apparatus, a virtual metrology method, and a virtual metrology program.

BACKGROUND ART

Conventionally, in the fields of various manufacturing processes (e.g., a semiconductor manufacturing process), the utilization of virtual metrology techniques has been advanced. The virtual metrology technique is the technology which estimates the inspection data of a resultant object based on measurement data (i.e., a dataset of a plurality of types of time series data, which will hereinafter be referred to as a time series data group) obtained during the processing of a target object (e.g., wafer) in various manufacturing processes.

Enabling a highly accurate virtual metrology process for all target objects by use of such a technique allows all the resultant objects to be virtually inspected.

RELATED-ART DOCUMENTS

Patent Document

[Patent Document 1] Japanese Laid-open Patent Publication No. 2009-282960
[Patent Document 2] Japanese Laid-open Patent Publication No. 2010-267242

SUMMARY OF THE INVENTION

Problem to be Solved by the Invention

The disclosures herein are aimed at providing a virtual metrology apparatus, a virtual metrology method, and a virtual metrology program that allow a highly accurate virtual metrology process to be performed.

Means to Solve the Problem

A virtual metrology apparatus according to one embodiment of the present disclosures has the configuration as follows, for example. Namely, the configuration includes:
   an acquisition unit configured to acquire a time series data group measured in association with processing of a target object in a predetermined processing unit of a manufacturing process; and
   a training unit configured to train a plurality of network sections by machine learning such that a result of consolidating output data produced by the plurality of network sections processing the acquired time series data group approaches inspection data of a resultant object obtained upon processing the target object in the predetermined processing unit of the manufacturing process.

Advantage of the Invention

The disclosures herein provide a virtual metrology apparatus, a virtual metrology method, and a virtual metrology program that allow a highly accurate virtual metrology process to be performed.

BRIEF DESCRIPTION OF DRAWINGS

FIG. 2 is a first drawing illustrating an example of a predetermined processing unit of a semiconductor manufacturing process.
FIG. 9 is a third drawing illustrating a specific example of processing by the branch section.
FIG. 11 is a fourth drawing illustrating a specific example of processing by the branch section.
FIG. 21 is a first drawing for explaining the accuracy of outcomes inferred by the inference unit.

MODE FOR CARRYING OUT THE INVENTION

In the following, embodiments will be described with reference to the accompanying drawings. In the specification and drawings, elements having substantially the same functions or configurations are referred to by the same numerals, and a duplicate description thereof will be omitted.

First Embodiment

<Entire Configuration of System Involving Semiconductor Manufacturing Process and Virtual Metrology Apparatus>

Figure 1:
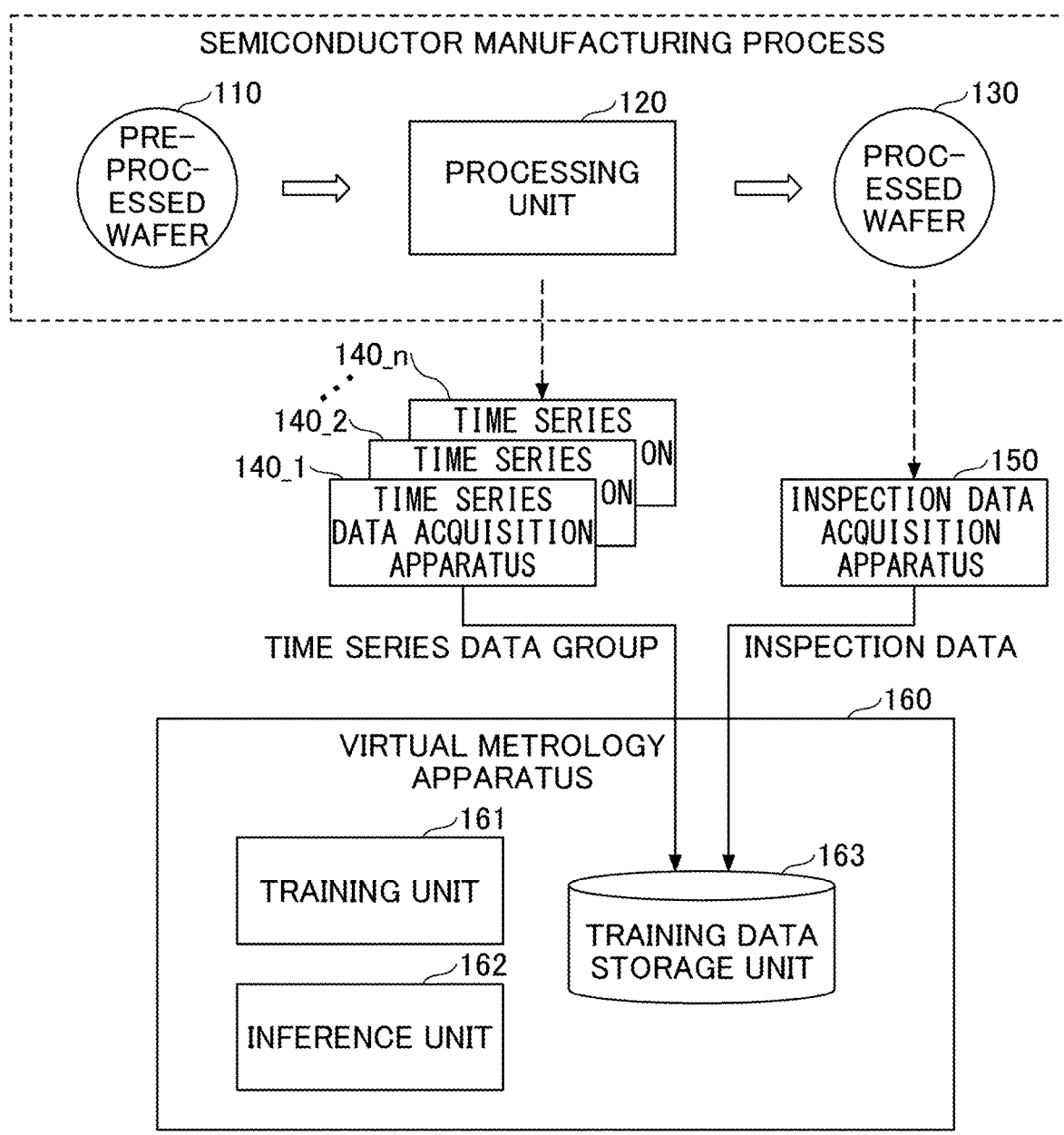
FIG. 1 is a drawing illustrating an example of the entire configuration of a system involving a semiconductor manufacturing process and a virtual metrology apparatus.

First, the entire configuration of a system involving a manufacturing process (i.e., semiconductor manufacturing process in this example) and a virtual metrology apparatus will be described. FIG. 1 is a drawing illustrating an example of the entire configuration of a system 100 involving a semiconductor manufacturing process and a virtual metrology apparatus. As illustrated in FIG. 1, the system 100 includes a semiconductor manufacturing process, time series data acquisition apparatuses 140_1 through 140_n, an inspection data acquisition apparatus 150, and a virtual metrology apparatus 160.

In a semiconductor manufacturing process, a target object (i.e., unprocessed wafer 110) is processed at a predetermined processing unit 120 to produce a resultant object (i.e., processed wafer 130). It may be noted that the processing unit 120 is an abstract idea, the detail of which will be described later. The unprocessed wafer 110 refers to a wafer (i.e., substrate) before being processed at the processing unit 120, and the processed wafer 130 refers to a wafer (i.e., substrate) that has been processed at the processing unit 120.

The time series data acquisition apparatuses 140_1 through 140_n each measure and acquire time series data associated with the processing of the unprocessed wafer 110 at the processing unit 120. The time series data acquisition apparatuses 140_1 through 140_n are supposed to measure respective, different kinds of measurement items. The number of measurement items measured by the time series data acquisition apparatuses 140_1 through 140_n may be one, or may be more than one. The time series data measured in association with the processing of the unprocessed wafer 110 includes not only the time series data measured during the processing of the unprocessed wafer 110 but also the time series data measured during a pre-process and a post-process performed before and after the processing of the unprocessed wafer 110. These processes may include a pre-process and a post-process performed in the absence of a wafer (i.e., substrate).

A time series data group acquired by the time series data acquisition apparatuses 140_1 through 140_n is stored in a training data storage unit 163 of the virtual metrology apparatus 160 as training data (i.e., input data).

The inspection data acquisition apparatus 150 inspects predetermined inspection items (e.g., ER (etch rate)) of the processed wafer 130 processed in the processing unit 120, thereby acquiring inspection data. The inspection data acquired by the inspection data acquisition apparatus 150 are stored in the training data storage unit 163 of the virtual metrology apparatus 160 as training data (i.e., supervisory data).

The virtual metrology apparatus 160 has a virtual metrology program installed therein, which is executed to cause the virtual metrology apparatus 160 to function as a training unit 161 and an inference unit 162.

The training unit 161 performs machine learning by using the time-series data group acquired by the time series data acquisition apparatuses 140_1 through 140_n and the inspection data acquired by the inspection data acquisition apparatus 150. Specifically, a plurality of network sections of the training unit 161 is trained by machine learning such that the plurality of network sections process a time series data group to output reproduced values of output data which approach the inspection data.

The inference unit 162 inputs, into the plurality of network sections trained by machine leaning, a time-series data group acquired in association with the processing of a new unprocessed wafer in the processing unit 120. With this arrangement, the inference unit 162 infers, and outputs as virtual metrology data, inspection data of the processed wafer based on the time series data acquired in association with the processing of the new unprocessed wafer.

In the manner described above, the time-series data group measured in association with the processing of a target object in a predetermined processing unit 120 of the semiconductor manufacturing process is processed by a plurality of network sections, so that the predetermined processing unit can be analyzed from different aspects. As a result, a model (i.e., inference unit 162) that achieves relatively high inference accuracy can be produced, compared with a configuration in which processing is performed by a single network section.

<Predetermined Processing Unit of Semiconductor Manufacturing Process>

In the following, the predetermined processing unit 120 of a semiconductor manufacturing process will be described. FIG. 2 is a first drawing illustrating an example of the predetermined processing unit of a semiconductor manufacturing process. As illustrated in FIG. 2, a semiconductor manufacturing apparatus 200, which is an example of a substrate processing apparatus, includes a plurality of chambers (which are an example of a plurality of processing spaces, and are chambers A to C in the example illustrated in FIG. 2). A wafer is processed in each of the chambers.

The configuration in which the plurality of chambers are defined as the processing unit 120 is designated as 2a. In this case, the unprocessed wafer 110 refers to a wafer before being processed in the chamber A, and the processed wafer 130 refers to a wafer after being processed in the chamber C.

The time series data group measured in association with the processing of the unprocessed wafer 110 in the processing unit 120 designated as 2a includes:
- a time series data group measured in association with processing in the chamber A (i.e., first processing space);
- a time series data group measured in association with processing in the chamber B (i.e., second processing space); and
- a time series data group measured in association with processing in the chamber C (i.e., third processing space).

The configuration in which a single chamber (i.e., chamber B in the example denoted as 2b) is defined as the processing unit 120 is designated as 2b. In this case, the unprocessed wafer 110 refers to a wafer before being processed in the chamber B (i.e., the wafer having been processed in the chamber A), and the processed wafer 130 refers to a wafer after being processed in the chamber B (i.e., the wafer before being processed in the chamber C).

The time series data group measured in association with the processing of the unprocessed wafer 110 in the processing unit 120 designated as 2b includes the time series data group measured in association with the processing of the unprocessed wafer 110 in the chamber B.

Figure 3:
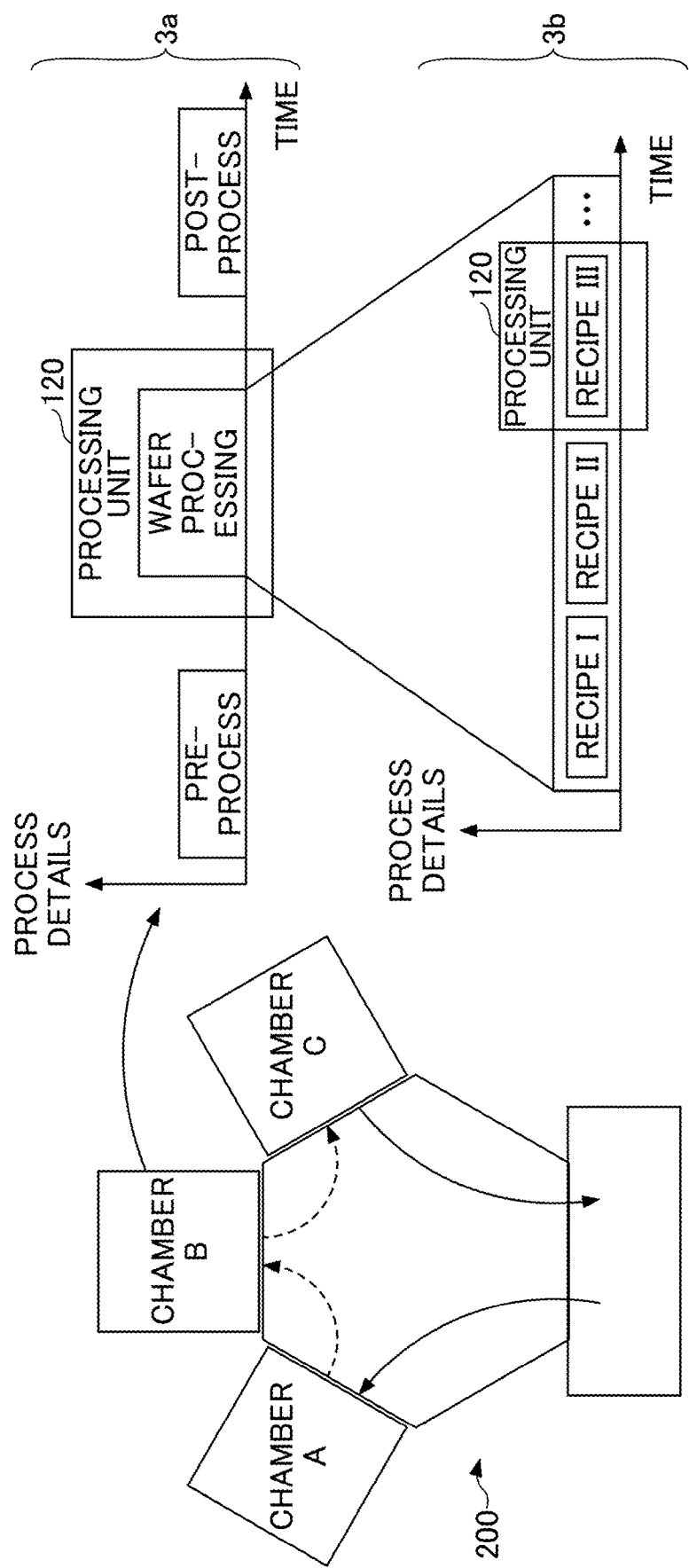
FIG. 3 is a second drawing illustrating an example of the predetermined processing unit of a semiconductor manufacturing process.

FIG. 3 is a second drawing illustrating an example of the predetermined processing unit of a semiconductor manufacturing process. As in the case of FIG. 2, the semiconductor manufacturing apparatus 200 includes a plurality of chambers, and a wafer is processed in each of the chambers.

The configuration in which the process (referred to as a "wafer processing") excluding the pre-process and the post-process among the processes in the chamber B is defined as the processing unit 120 is designated as 3*a*. In this case, the unprocessed wafer 110 refers to a wafer existing before the wafer processing is performed (i.e., the wafer having been treated by the pre-process), and the processed wafer 130 refers to a wafer existing after the wafer processing is performed (i.e., the wafer before being treated by the post-process).

The time series data group measured in association with the processing of the unprocessed wafer 110 in the processing unit 120 designated as 3*a* includes the time series data group measured in association with the wafer processing performed on the unprocessed wafer 110 in the chamber B.

The example designated as 3*a* demonstrates a case in which the wafer processing is defined as the processing unit 120 when the pre-process, the wafer processing (main process), and the post-process are performed in the same chamber (i.e., in the chamber B). Notwithstanding this, the pre-process, the wafer processing, and the post-process may be performed in the chamber A, the chamber B, and the chamber C, respectively, for example. In other words, these processes may be performed in respective, different chambers. In such a case, each process in a respective chamber may be defined as the processing unit 120.

Alternatively, the configuration in which the process of a single recipe (i.e., recipe III in the example denoted as 3*b*) included in the wafer processing is defined as the processing unit 120 is designated as 3*b*. In this case, the unprocessed wafer 110 refers to a wafer existing before the process of the recipe III is performed (i.e., the wafer having been treated by the process of the recipe II), and the processed wafer 130 refers to a wafer existing after the process of the recipe III is performed (i.e., the wafer before being treated by the process of a recipe IV (not shown)).

The time series data group measured in association with the processing of the unprocessed wafer 110 in the processing unit 120 designated as 3*a* includes the time series data group measured in association with the wafer processing performed on the unprocessed wafer 110 based on the recipe III in the chamber B.

Specific Example of Time Series Data Group

Figure 4:
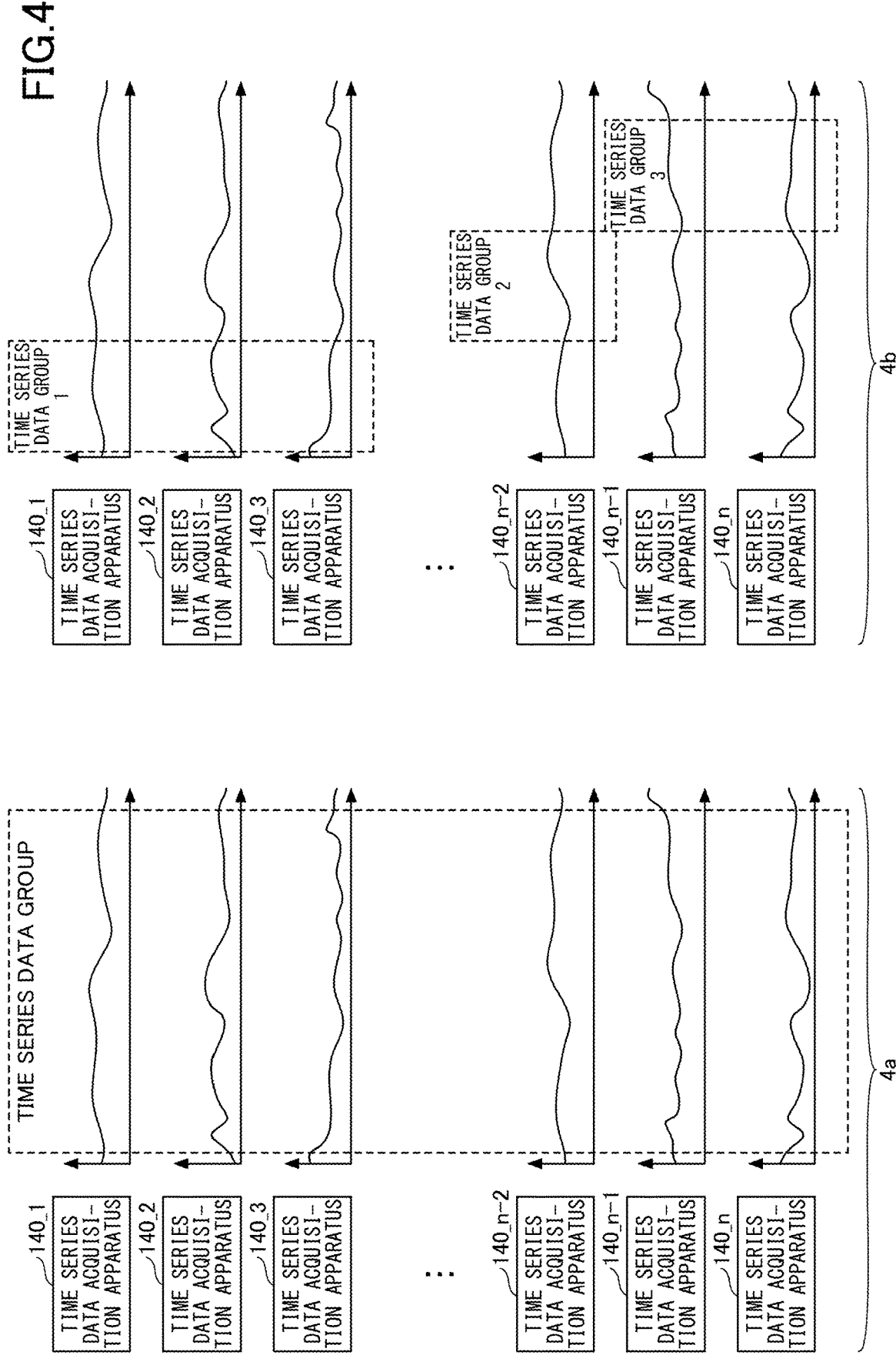
FIG. 4 is a drawing illustrating examples of an acquired time series data group.

In the following, a specific example of the time series data group acquired by the time series data acquisition apparatuses 140_1 through 140_*n* will be described. FIG. 4 is a drawing illustrating examples of the acquired time series data group. The examples illustrated in FIG. 4 are configured, for the sake of simplicity of explanation, such that each of the time series data acquisition apparatuses 140_1 through 140_*n* measures one-dimensional data. Notwithstanding this, one time series data acquisition apparatus may measure two-dimensional data (i.e., a data set comprised of two or more kinds of one-dimensional data).

Among the examples, a time series data group 4a represents the one which is observed when the processing unit 120 is defined by any one of 2*b*, 3*a*, and 3*b*. In this case, the time series data acquisition apparatuses 140_1 through 140_*n* each acquire time series data measured in association with the process in the chamber B. Further, the time series data acquisition apparatuses 140_1 through 140_*n* acquire, as a time series data group, respective time series data measured in the same time period.

Alternatively, a time series data group 4b represents the one which is observed when the processing unit 120 is defined by 2*a*. In this case, the time series data acquisition apparatuses 140_1 through 140_3 acquire a time series data group 1 measured in association with the processing of a wafer in the chamber A, for example. Further, the time series data acquisition apparatus 140_*n*-2 acquires a time series data group 2 measured in association with the processing of the wafer in the chamber B, for example. Moreover, the time series data acquisition apparatuses 140_*n*-1 through 140_*n* acquire a time series data group 3 measured in association with the processing of the wafer in the chamber C.

The case of 4*a* illustrates the one in which the time series data acquisition apparatuses 140_1 through 140_*n* acquire, as a time series data group, respective time series data in the same time period measured in association with the processing of the unprocessed wafer in the chamber B. Notwithstanding this, the time series data acquisition apparatuses 140_*n*-1 through 140_*n* may acquire, as a time series data group, respective time series data in different time periods measured in association with the processing of the unprocessed wafer in the chamber B.

Specifically, the time series data acquisition apparatuses 140_1 through 140_*n* may acquire, as a time series data group 1, respective time series data measured during the performance of the pre-process. Further, the time series data acquisition apparatuses 140_1 through 140_*n* may acquire, as a time series data group 2, respective time series data measured during the wafer processing. Moreover, the time series data acquisition apparatuses 140_1 through 140_*n* may acquire, as a time series data group 3, respective time series data measured during the performance of the post-process.

Similarly, the time series data acquisition apparatuses 140_1 through 140_*n* may acquire, as a time series data group 1, respective time series data measured during the performance of the recipe I. Further, the time series data acquisition apparatuses 140_1 through 140_*n* may acquire, as a time series data group 2, respective time series data measured during the performance of the recipe II. Moreover, the time series data acquisition apparatuses 140_1 through 140_*n* may acquire, as a time series data group 3, respective time series data measured during the performance of the recipe III.

<Hardware Configuration of Virtual Metrology Apparatus>

Figure 5:
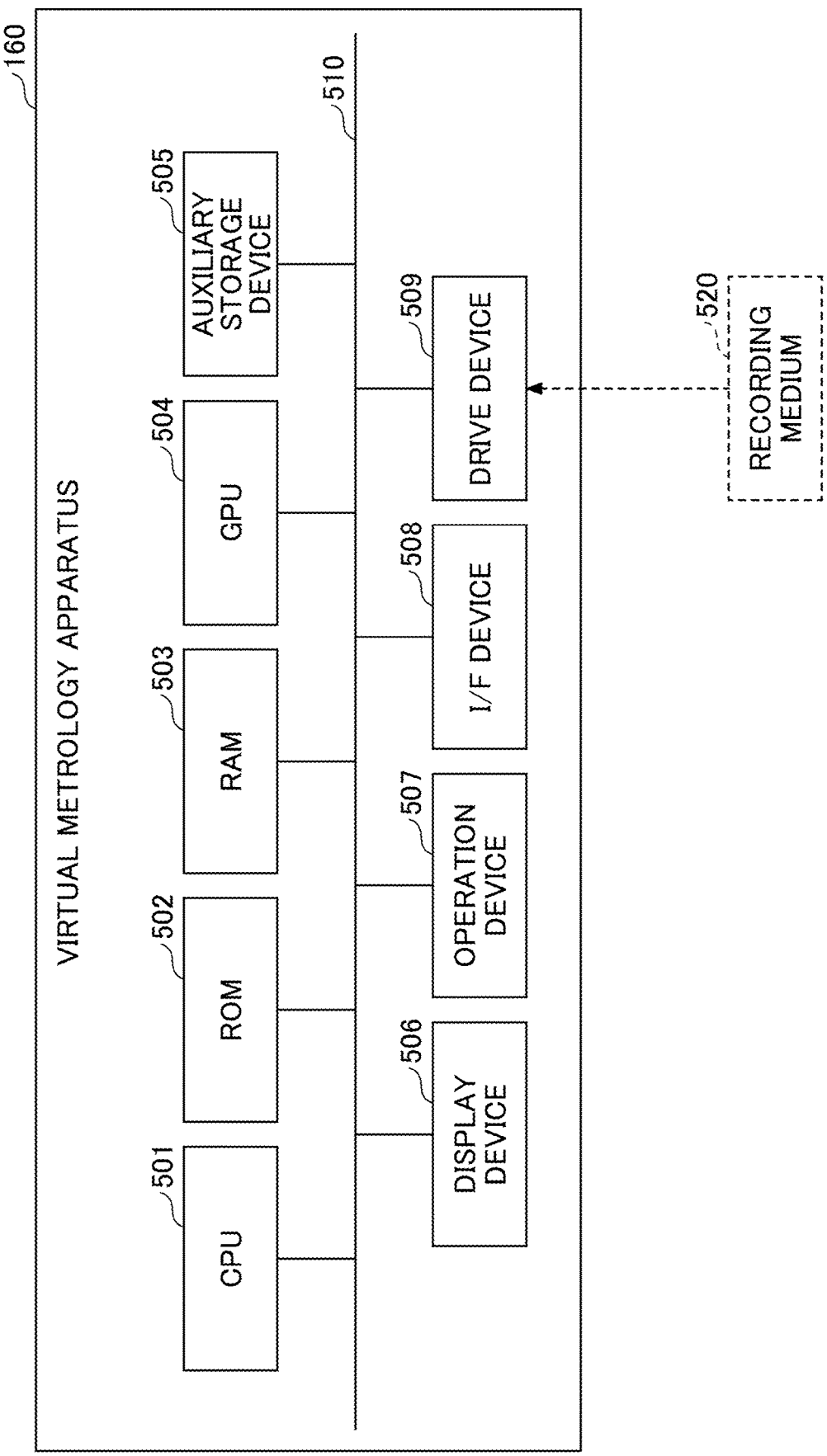
FIG. 5 is a drawing illustrating an example of the hardware configuration of the virtual metrology apparatus.

In the following, the hardware configuration of the virtual metrology apparatus 160 will be described. FIG. 5 is a drawing illustrating an example of the hardware configuration of the virtual metrology apparatus. As illustrated in FIG. 5, the virtual metrology apparatus 160 includes a CPU (central processing unit) 501, a ROM (read only memory) 502, and a ram (random access memory) 503. The virtual metrology apparatus 160 also includes a GPU (graphic processing unit) 504. The processors (i.e., processing circuits or processing circuitry) such as the CPU 501 and the GPU 504 and the memories such as the ROM 502 and the RAM 503 constitute what is known as a computer.

The virtual metrology apparatus 160 further includes an auxiliary storage device 505, a display device 506, an operation device 507, an I/F (interface) device 508, and a drive device 509. The individual hardware parts of the virtual metrology apparatus 160 are connected to one another through a bus 510.

The CPU 501 is an arithmetic device which executes various types of programs (e.g., virtual metrology programs) installed in the auxiliary storage device 505.

The ROM 502 is a nonvolatile memory, and serves as a main memory device. The ROM 502 stores various types of programs, data, and the like necessary for the CPU 501 to execute the various types of programs installed in the auxiliary storage device 505. Specifically, the ROM 502 stores boot programs and the like such as BIOS (basic input/output system) and EFI (extensible firmware interface).

The RAM 503 is a volatile memory such as a DRAM (dynamic random access memory) and an SRAM (static random access memory), and serves as a main memory device. The RAM 503 provides a work area to which the various types of programs installed in the auxiliary storage device 505 are loaded when executed by the CPU 501.

The GPU 504 is an arithmetic device for image processing. When a virtual metrology program is executed by the CPU 501, the GPU 504 performs high-speed arithmetic operations based on parallel processing with respect to the various types of image data (i.e., a time-series data group in the present embodiment). The GPU 504 includes an internal memory (i.e., GPU memory), which temporarily retains information necessary to perform parallel processing with respect to the various types of image data.

The auxiliary storage device 505 stores various types of programs, and stores various types of data and the like used when the various types of programs are executed by the CPU 501.

The display device 506 is a display apparatus that displays the internal state of the virtual metrology apparatus 160. The operation device 507 is an input device used by the administrator of the virtual metrology apparatus 160 to input various types of instructions into the virtual metrology apparatus 160. The I/F device 508 is a connection device for connecting to, and communicating with, a network (not shown).

The drive device 509 is a device to which a recording medium 520 is set. Here, the recording medium 520 includes a medium for optically, electrically, or magnetically recording information, such as a CD-ROM, a flexible disk, a magneto-optical disk, or the like. The recording medium 520 may also include a semiconductor memory or the like that electrically records information, such as a ROM, a flash memory, or the like.

The various types of programs to be installed in the auxiliary storage device 505 are installed by the drive device 509 reading the various types of programs recorded in the recording medium 520 upon the recording medium 520 being supplied and set in the drive device 509, for example. Alternatively, the various types of programs to be installed in the auxiliary storage device 505 may be installed upon being downloaded via a network.

<Functional Configuration of Training Unit>

Figure 6:
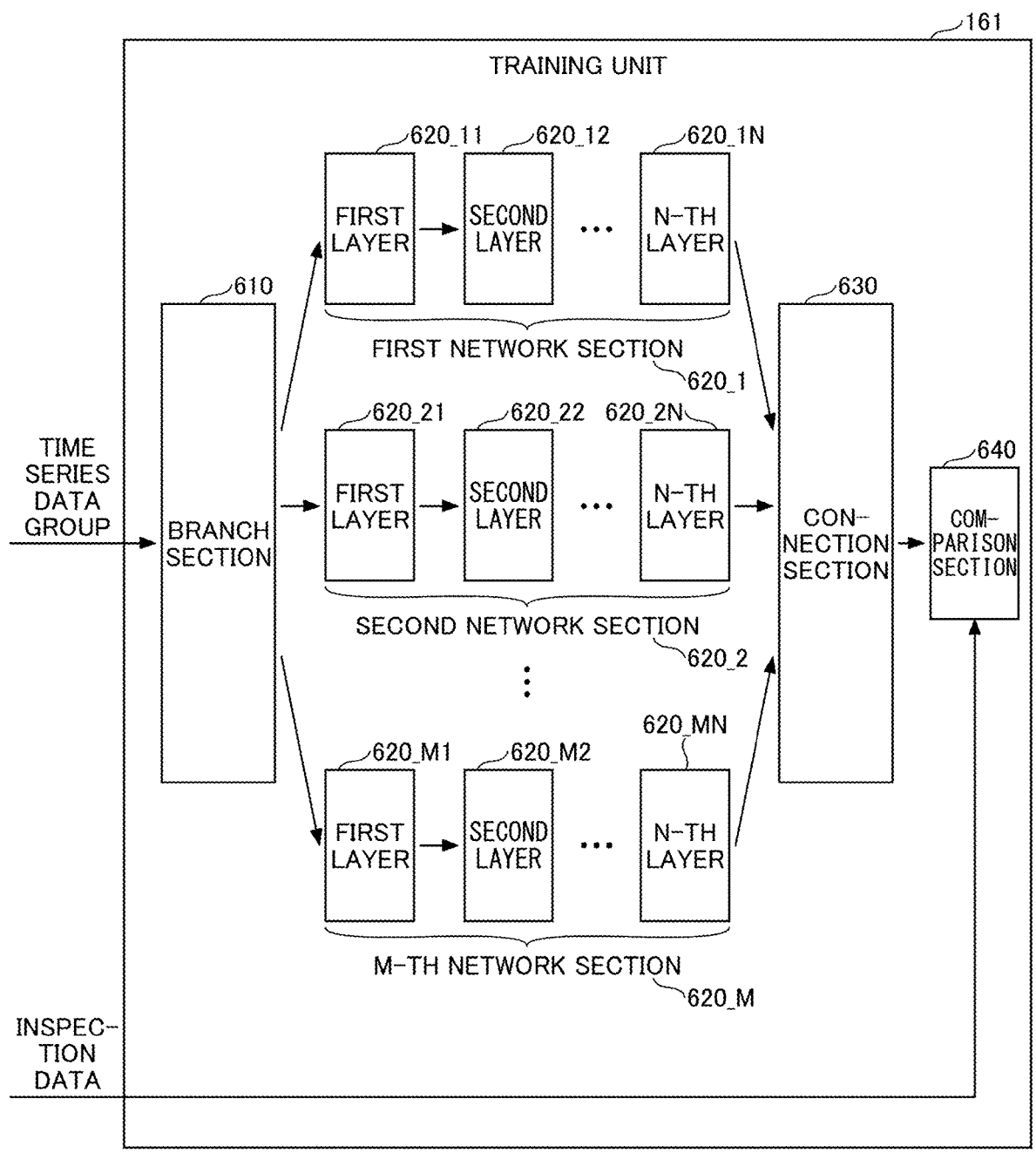
FIG. 6 is a drawing illustrating an example of the configuration of a training unit.

In the following, the configuration of the training unit 161 will be described. FIG. 6 is a drawing illustrating an example of the configuration of a training unit. The training unit 161 includes a branch section 610, a first network section 620_1 through an M-th network section 620_M, a connection section 630, and a comparison section 640.

The branch section 610, which is an example of an acquiring section, reads a time-series data group from the training data storage unit 163. The branch section 610 processes the read time series data group such that the read time series data group is processed using a plurality of network sections, i.e., the first network section 620_1 through the M-th network section 620_M.

The first network section 620_1 through the M-th network section 620_M are each configured based on a convolution neural network (CNN) having a plurality of layers.

Specifically, the first network section 620_1 has a first layer 620_11 through an N-th layer 620_1N. Similarly, the second network section 620_2 has a first layer 620_21 through an N-th layer 620_2N. The rest is configured similarly, and the M-th network section 620_M has a first layer 620_M1 through an N-th layer 620_MN.

Each layer of the first network section 620_1, i.e., the first layer 620_11 through the N-th layer 620_1N, performs various kinds of processing such as normalization, convolution, activation, and pooling. Each layer of the second network section 620_2 through the M-th network section 620_M perform substantially the same kinds of processing.

The connection section 630 consolidates all the output data, i.e., the output data output from the N-th layer 620_1N of the first network section 620_1 through the output data output from the N-th layer 620_MN of the M-th network section 620_M, to output the consolidated result to the comparison section 640.

The comparison section 640 compares the consolidated result output from the connection section 630 with the inspection data (correct supervisory data) read from the training data storage unit 163 to calculate the error. In the training unit 161, the first network section 620_1 through the M-th network section 620_M and the connection section 630 are trained by machine learning such that the error calculated by the comparison section 640 satisfies a predetermined condition.

This arrangement serves to optimize the model parameters of the first layer through the N-th layer of each of the first network section 620_1 through the M-th network section 620_M as well as the model parameters of the connection section 630.

<Detail of Processing by Each Section of Training Unit>

In the following, the detail of processing by each section of the training unit 161 will be described by referring to specific examples.

(1) Detail 1 of Processing by Branch Section

Figure 7:
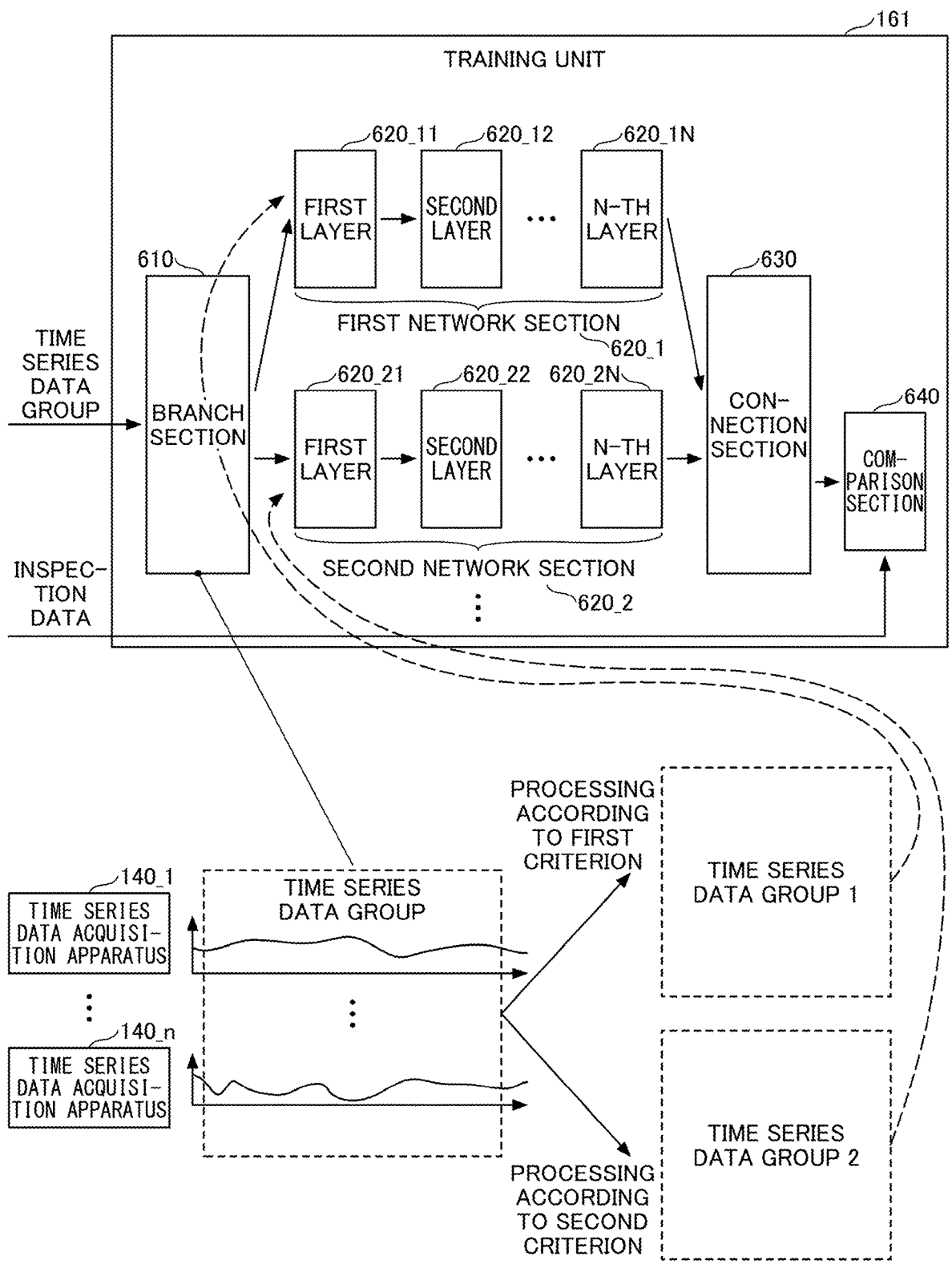
FIG. 7 is a first drawing illustrating a specific example of processing by the branch section.

The detail of processing by the branch section 610 will be described first. FIG. 7 is a first drawing illustrating a specific example of processing by the branch section. In the case of FIG. 7, the branch section 610 processes the time series data group measured by the time series data acquisition apparatuses 140_1 through 140_n in accordance with a first criterion to generate a time series data group (i.e., first time series data group) for inputting into the first network section 620_1.

Further, the branch section 610 processes the time series data group measured by the time series data acquisition apparatuses 140_1 through 140_n in accordance with a second criterion to generate a time series data group 2 (i.e., second time series data group) for inputting into the second network section 620_2.

In this manner, the time series data group is processed according to different criteria so as to be configured for processing by respective, separate network sections for machine learning, so that the processing unit 120 can be analyzed from different aspects. As a result, a model (i.e., inference unit 162) that achieves relatively high inference accuracy can be produced, compared with a configuration in which the time series data group is processed by using a single network section.

The example illustrated in FIG. 7 is directed to a case in which the time series data group is processed in accordance with two types of criteria to generate two kinds of time series data groups. Alternatively, the time series data group may be processed in accordance with three or more kinds of criteria to generate three or more kinds of time series data groups.

(2) Detail 2 of Processing by Branch Section

Figure 8:
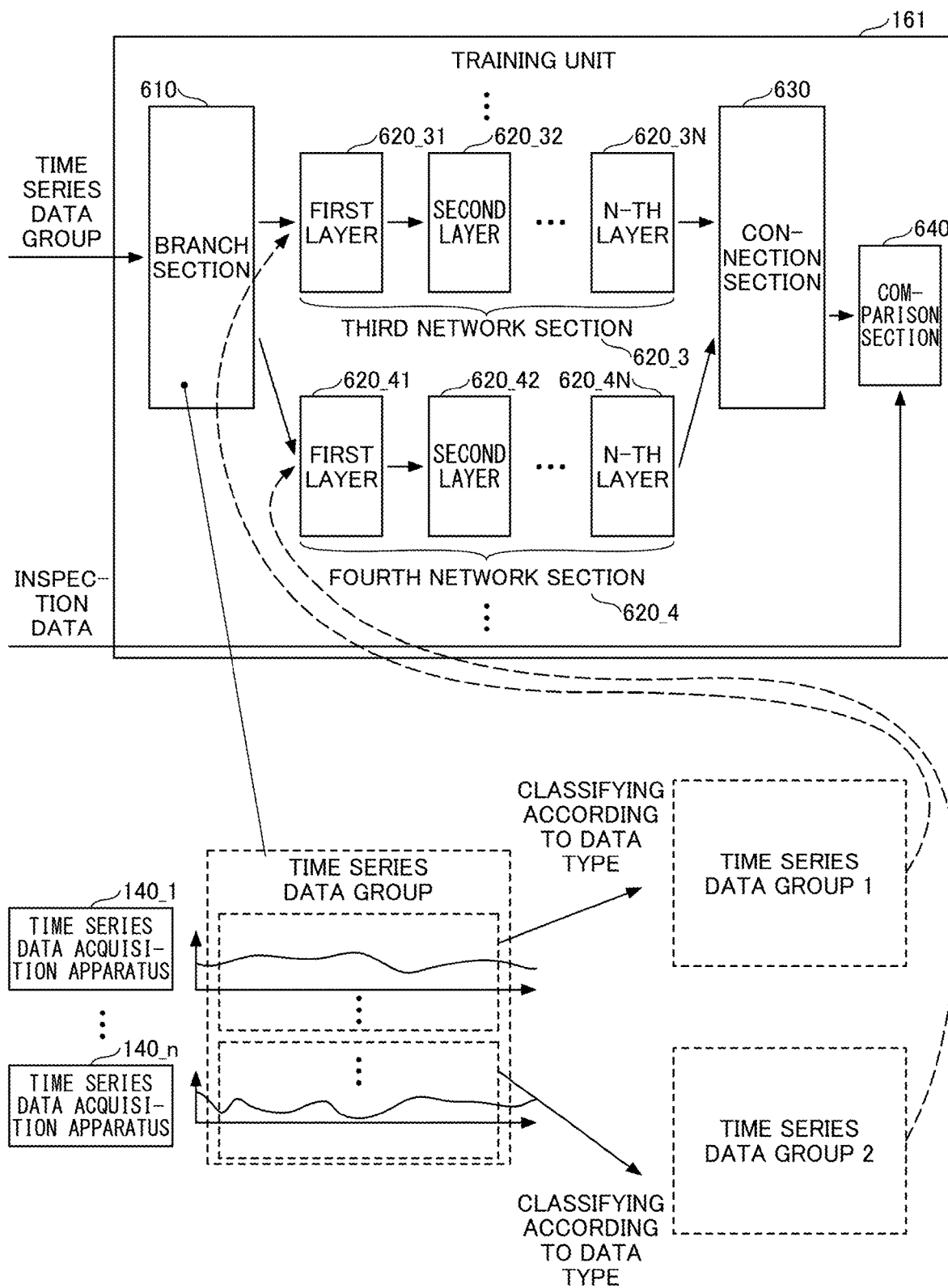
FIG. 8 is a second drawing illustrating a specific example of processing by the branch section.

In the following, the detail of different processing by the branch section 610 will be described. FIG. 8 is a second drawing illustrating a specific example of processing by the branch section. In the case of FIG. 8, the branch section 610 divides the time series data group measured by the time series data acquisition apparatuses 140_1 through 140_n into groups in accordance with data types to generate a time series data group 1 (i.e., first time series data group) and a time series data group 2 (i.e., second time series data group). Further, the branch section 610 inputs the generated time series data group 1 into the third network section 620_3 and inputs the generated time series data group 2 into the fourth network section 620_4.

In this manner, the time series data group is divided, according to data types, into groups which are configured for processing by respective, separate network sections for machine learning, so that the processing unit 120 can be analyzed from different aspects. As a result, a model (i.e., inference unit 162) that achieves relatively high inference accuracy can be produced, compared with a configuration in which the time series data group is input into a single network section for machine learning.

In the example illustrated in FIG. 8, the time series data group is divided into groups according to a difference in data type based on a difference in the time series data acquisition apparatuses 140_1 through 140_n. Alternatively, the time series data group may be divided into groups according to the time frame in which data is acquired. For example, the time series data group may be the one which is measured in association with processes based on respective recipes. In such a case, the time series data group may be divided into groups according to the time frames of the respective recipes.

(3) Detail 3 of Processing by Branch Section

In the following, the detail of different processing by the branch section 610 will be described. FIG. 9 is a third drawing illustrating a specific example of processing by the branch section. In the case of FIG. 9, the branch section 610 inputs the time series data group measured by the time series data acquisition apparatuses 140_1 through 140_n into both the fifth network section 620_5 and the sixth network section 620_6. The fifth network section 620_5 and the sixth network section 620_6 apply respective, different processes (i.e., normalization processes) to the same time series data group.

Figure 10:
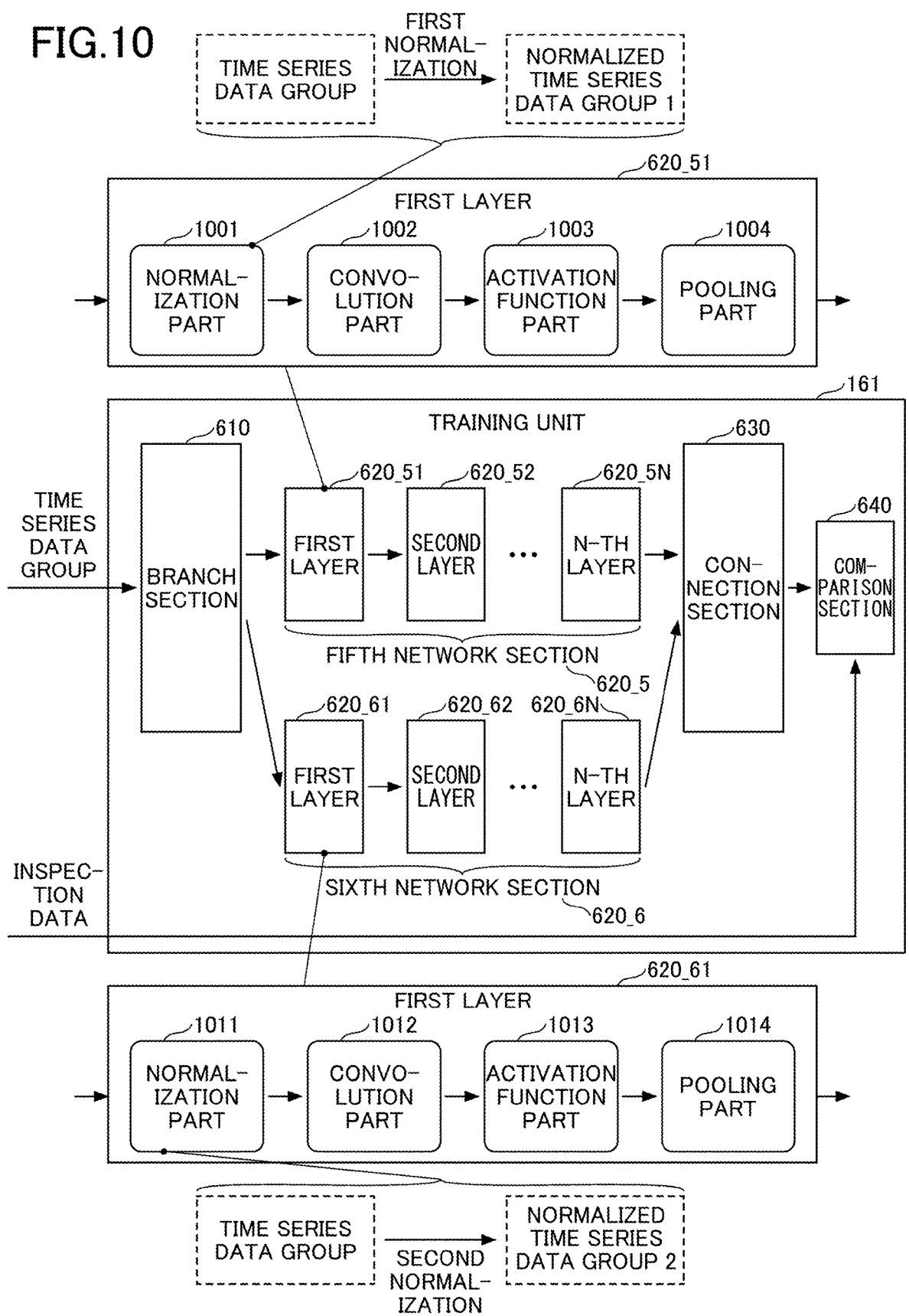
FIG. 10 is a drawing illustrating a specific example of processing by a normalization part included in each network section.

FIG. 10 is a drawing illustrating a specific example of processing by a normalization part included in each network section. As illustrated in FIG. 10, each layer of the fifth network section 620_5 includes a normalization part, a convolution part, an activation function part, and a pooling part.

The example illustrated in FIG. 10 shows a case in which the first layer 620_51, among the layers of the fifth network section 620_5, includes a normalization part 1001, a convolution part 1002, an activation function part 1003, and a pooling part 1004.

Among these, the normalization part 1001 performs a first normalization process on the time series data group inputted by the branch section 610 to generate a normalized time series data group 1 (i.e., the first time series data group).

Similarly, the example illustrated in FIG. 10 shows a case in which the first layer 620_61, among the layers of the sixth network section 620_6, includes a normalization part 1011, a convolution part 1012, an activation function part 1013, and a pooling part 1014.

Among these, the normalization part 1011 performs a second normalization process on the time series data group inputted by the branch section 610 to generate a normalized time series data group 2 (i.e., the second time series data group).

In this manner, the network sections including respective normalization parts for performing normalization processes based on respective, different algorithms are configured to process the time series data group for machine learning, so that the processing unit 120 can be analyzed from different aspects. As a result, a model (i.e., inference unit 162) that achieves relatively high inference accuracy can be produced, compared with a configuration in which the time series data group is processed by using a single network section to perform a single normalization process.

(4) Detail 4 of Processing by Branch Section

In the following, the detail of different processing by the branch section 610 will be described. FIG. 11 is a fourth drawing illustrating a specific example of processing by the branch section. In the case of FIG. 11, the branch section 610 inputs, into the seventh network section 620_7, a time series data group 1 (i.e., the first time series data group) measured in association with the process in the chamber A, among the time series data group measured by the time series data acquisition apparatuses 140_1 through 140.

Further, the branch section 610 inputs, into the eighth network section 620_8, a time series data group 2 (i.e., the second time series data group) measured in association with the process in the chamber B, among the time series data group measured by the time series data acquisition apparatuses 140_1 through 140.

In this manner, the time series data groups measured in association with processes in the respective, different chambers (i.e., the first processing space and the second processing space) are processed by the respective, separate network sections for machine learning, so that the processing unit 120 can be analyzed from different aspects. As a result, a model (i.e., inference unit 162) that achieves relatively high inference accuracy can be produced, compared with a configuration in which the time series data groups are processed by using a single network section.

<Functional Configuration of Inference Unit>

Figure 12:
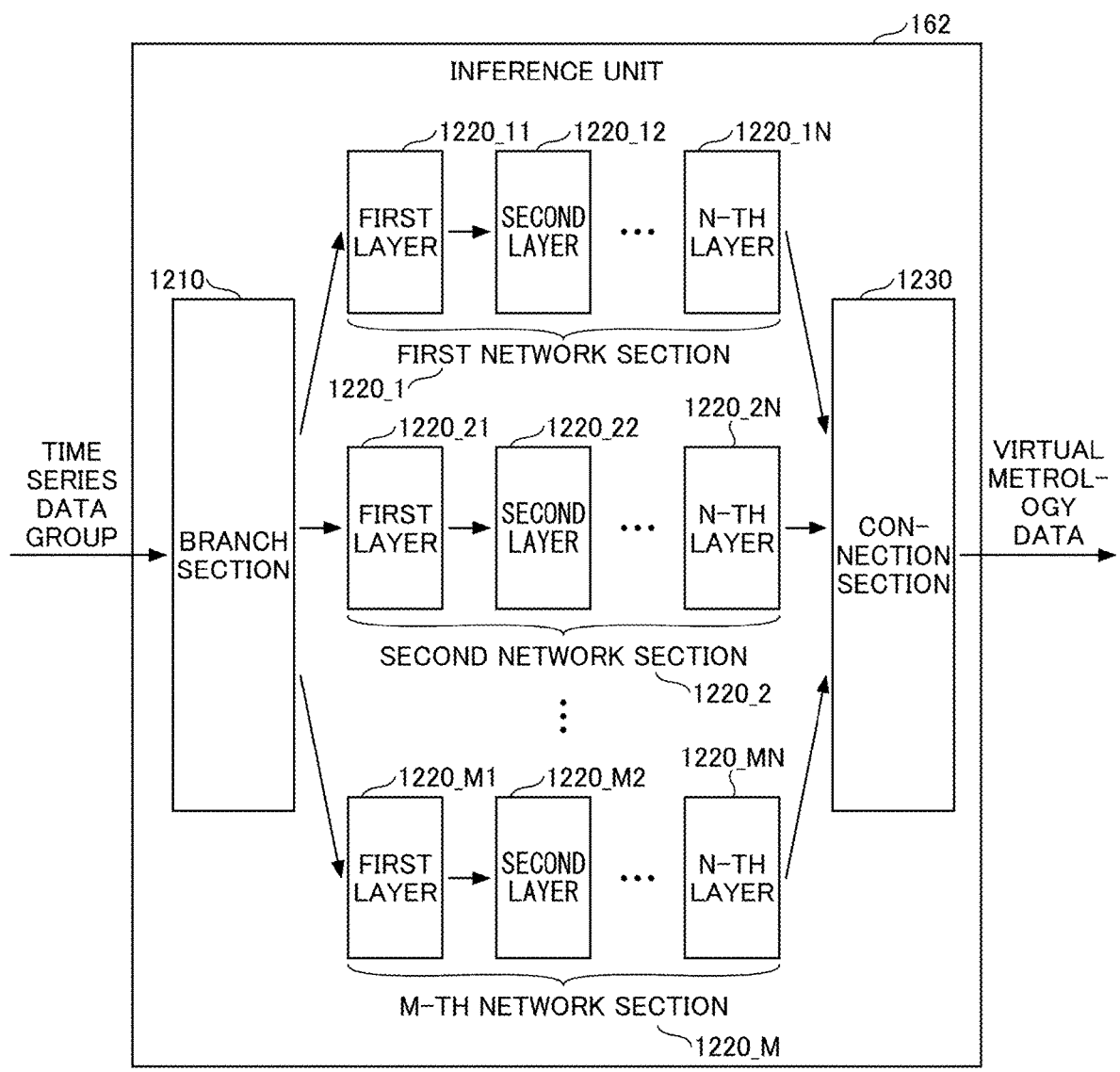
FIG. 12 is a drawing illustrating an example of the configuration of an inference unit.

In the following, the configuration of the inference unit 162 will be described. FIG. 12 is a drawing illustrating an example of the configuration of an inference unit. As illustrated in FIG. 12, the inference unit 162 includes a branch section 1210, a first network section 1220_1 through an M-th network section 1220_M, and a connection section 1230.

The branch section 1210 acquires a time series data group newly measured by the time series data acquisition apparatuses 140_1 through 140_n. The branch section 1210 controls the acquired time series data group such that it is processed by the first network section 1220_1 through the M-th network section 1220_M.

The first network section 1220_1 through the M-th network section 1220_M are formed by machine learning performed by the training unit 161 that optimizes the model parameters of each layer of the first network section 620_1 through the M-th network section 620_M.

The connection section 1230 is implemented as the connection section 630 whose model parameters are optimized by the training unit 161 performing machine learning. The connection section 1230 consolidates all the output data, i.e., the output data output from the N-th layer 1220_1N of the first network section 1220_1 through the output data output from the N-th layer 1220_MN of the M-th network section 1220_M, to output virtual metrology data.

<Flow of Virtual Metrology Process>

Figure 13:
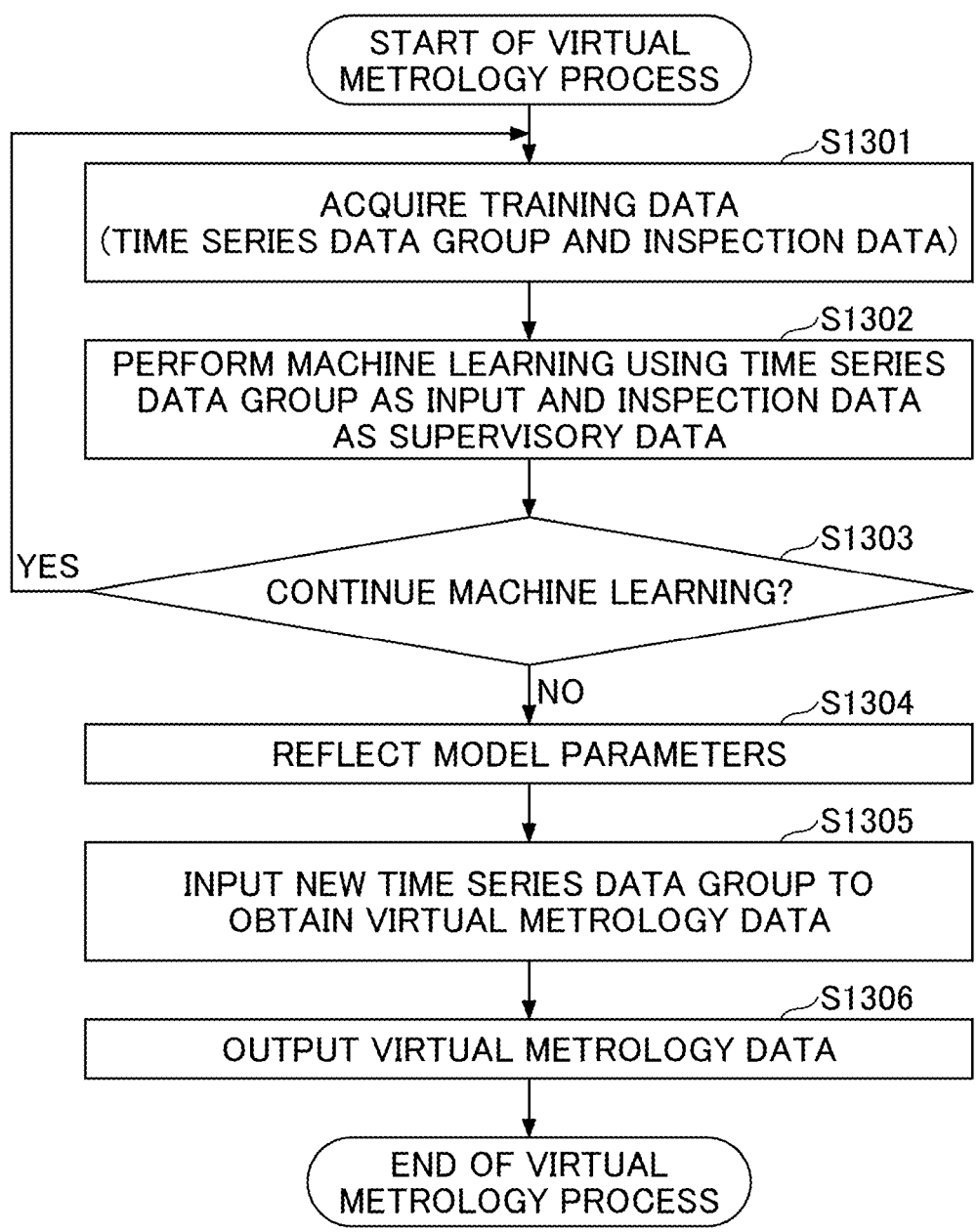
FIG. 13 is a flowchart illustrating the flow of a virtual metrology process performed by a virtual metrology apparatus.

In the following, the flow of the entire virtual metrology process by the virtual metrology apparatus 160 will be described. FIG. 13 is a flowchart illustrating the flow of a virtual metrology process performed by a virtual metrology apparatus.

In step S1301, the training unit 161 acquires a time series data group and inspection data as training data.

In step S1302, the training unit 161 uses, among the acquired training data, the time series data group as input data and the inspection data as supervisory data to perform machine learning.

In step S1303, the training unit 161 determines whether to continue machine learning. In the case of continuing machine learning by acquiring additional training data (i.e., in the case of YES in step S1303), the procedure returns to step S1301. In the case of terminating machine learning (i.e., in the case of NO in step S1303), the procedure proceeds to step S1304.

In step S1304, the inference unit 162 uses model parameters optimized by machine learning to generate the first network section 1220_1 through the M-th network section 1220_M.

In step S1305, the inference unit 162 receives a time series data group measured in association with the processing of a new unprocessed wafer to infer virtual metrology data.

In step S1306, the inference unit 162 outputs the inferred virtual metrology data.

<Summary>

As is understood from the descriptions provided heretofore, the virtual metrology apparatus of the first embodiment is configured:

- to acquire a time series data group measured in association with the processing of a target object in a predetermined processing unit of a manufacturing process;
- with respect to the acquired time series data,
    - to process the time series data group in accordance with first and second criterion to generate a first time series data group and a second time series data group; or
    - to divide the time series data group, in accordance with data types or time frames, into groups, which are then processed by a plurality of network sections, followed by consolidating all output data thus produced; or
    - to cause the acquired time series data to be input into a plurality of network sections performing normalization based on respective, different algorithms, and to be processed by the plurality of network sections, followed by consolidating all output data thus produced;
- to train the plurality of network sections by machine learning such that the consolidated result obtained by consolidating all the output data approaches inspection data of the resultant object obtained by processing the target object in the predetermined processing unit of the manufacturing process; and
- to process a time series data group acquired with respect to a new target object by use of the plurality of network sections trained by machine learning, and to obtain, as inferred inspection data of a resultant object obtained upon processing the new target object, the result of consolidating all the output data produced by the plurality of network section.

In this manner, the time series data group is configured for processing by the plurality of network sections for machine learning, so that the predetermined processing unit of a manufacturing process can be analyzed from different aspects. As a result, a model that achieves relatively high inference accuracy can be produced, compared with a configuration in which a time series data group is processed by using a single network section. Further, use of such a model for inference enables a highly accurate virtual metrology process.

Consequently, the first embodiment can provide a virtual metrology apparatus that is capable of performing a highly accurate virtual metrology process.

Second Embodiment

In the first embodiment, four types of configurations have been described with respect to the configuration which processes an acquired time series data group by using a plurality of network sections. In the second embodiment, further details will be described with respect to one of these configurations, i.e., the configuration in which a time series data group is processed by a plurality of network sections that include respective normalization parts for performing respective, different algorithms for normalization, particularly in the case of:

- the time series data acquisition apparatus being an optical emission spectrometer; and
- the time series data group being OES (optical emission spectroscopy) data (i.e., a data set including a plurality of emission intensity time series data that are equal in number to the number of wavelength types).

In the following, a description will be given with a focus on the differences from the first embodiment.

<Entire Configuration of System Involving Semiconductor Manufacturing Process and Virtual Metrology Apparatus>

Figure 14:
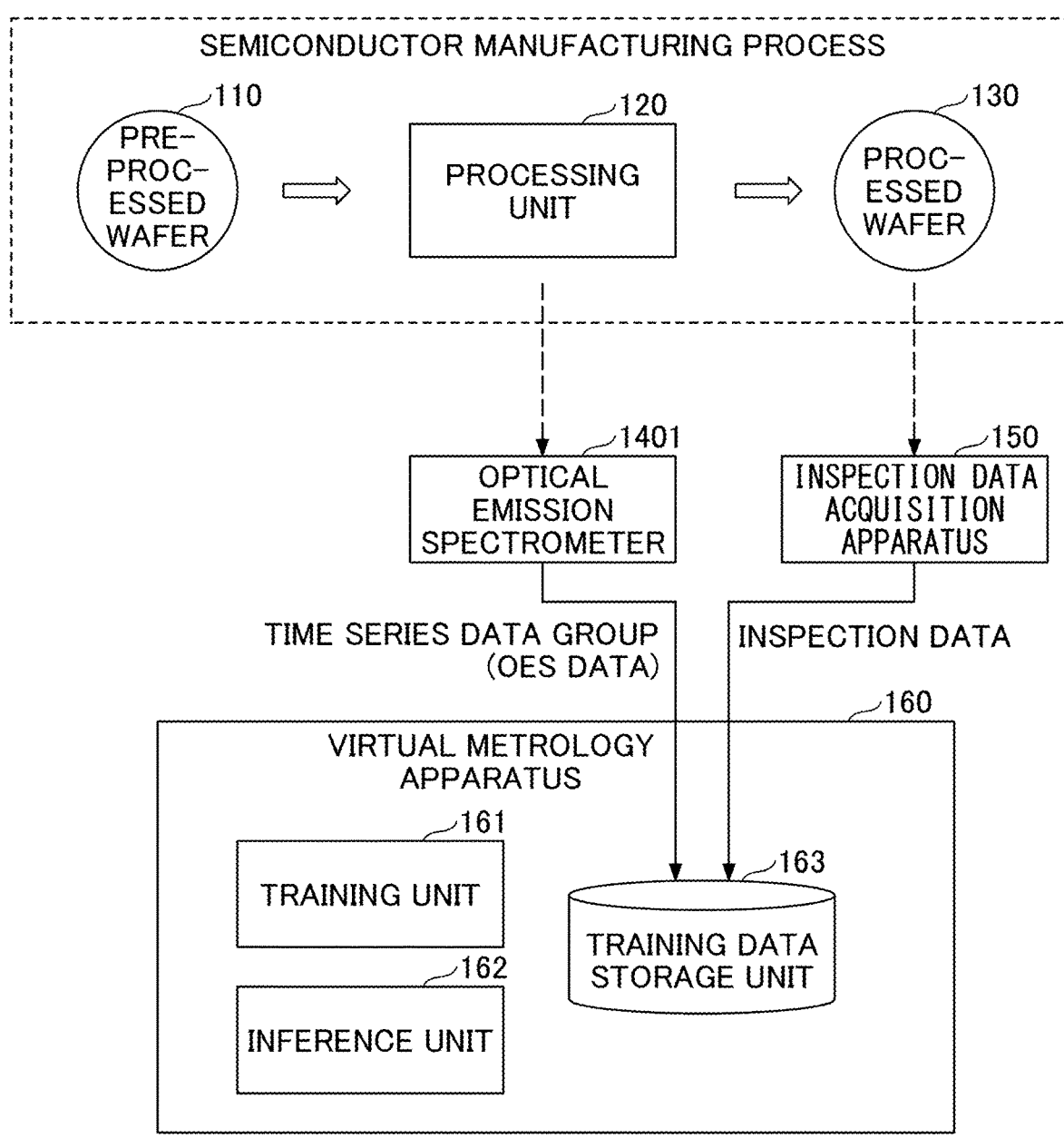
FIG. 14 is a drawing illustrating an example of the entire configuration of a system involving a virtual metrology apparatus and a semiconductor manufacturing process in which the time series data acquisition apparatuses is an optical emission spectrometer.

First, a description will be given with respect to the entire configuration of a system involving a virtual metrology apparatus and a semiconductor manufacturing process in which the time series data acquisition apparatus is an optical emission spectrometer. FIG. 14 is a drawing illustrating an example of the entire configuration of a system involving a virtual metrology apparatus and a semiconductor manufacturing process in which the time series data acquisition apparatuses is an optical emission spectrometer.

In the system 1400 illustrated in FIG. 14, an optical emission spectrometer 1401 uses an optical emission spectroscopy technique to output OES data, which is a time series data group, in conjunction with the processing of the unprocessed wafer 110 in the processing unit 120. The OES data output from the optical emission spectrometer 1401 is partially stored in the training data storage unit 163 of the virtual metrology apparatus 160 as training data (input data) for performing machine learning.

Specific Example of Time Series Data Group

Figure 15:
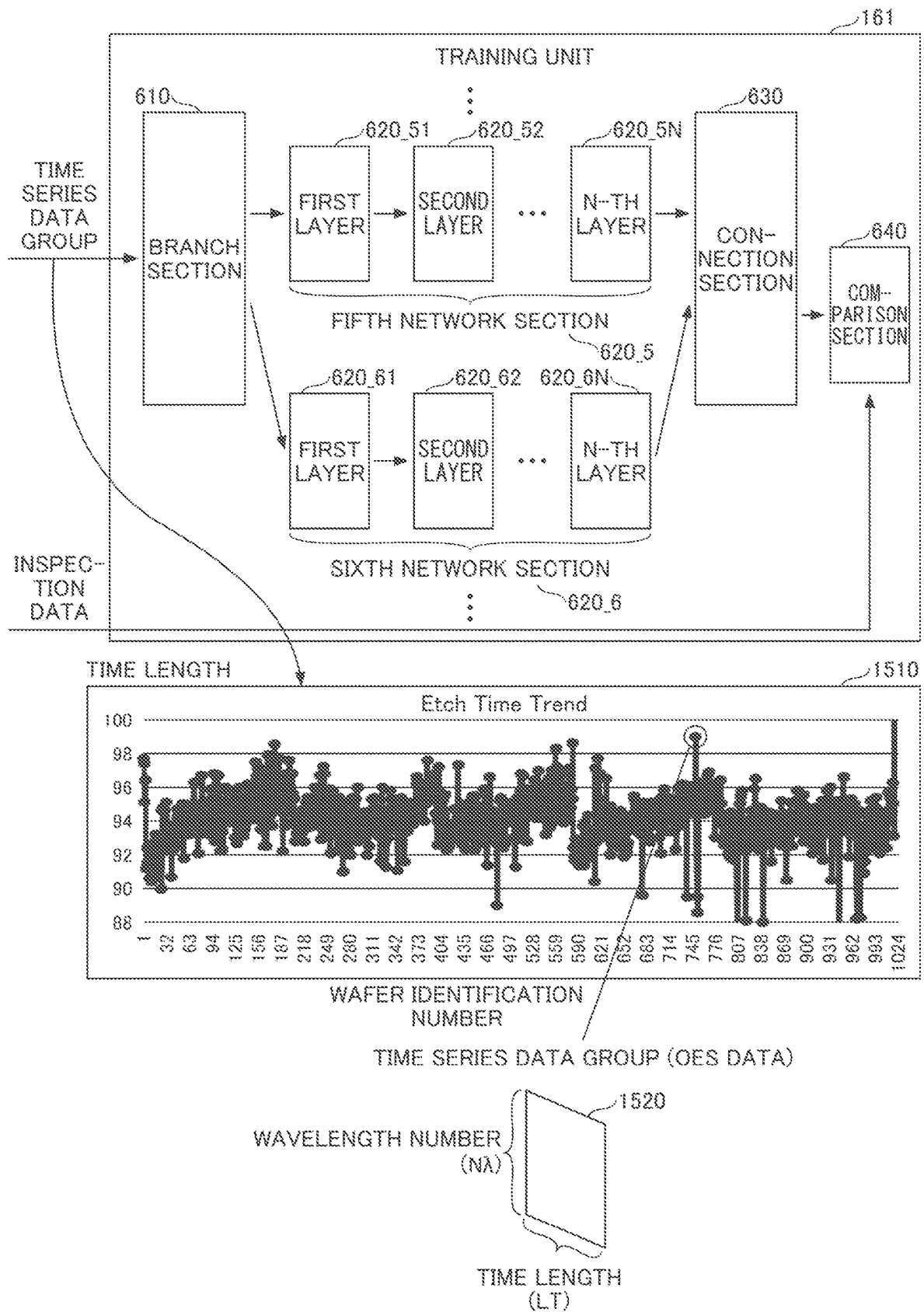
FIG. 15 is a drawing illustrating an example of acquired OES data.

In the following, a specific example of time-series-data-group OES data acquired by the optical emission spectrometer 1401 will be described. FIG. 15 is a drawing illustrating an example of the acquired OES data.

In FIG. 15, a graph 1510 represents the characteristics of OES data, which is a time series data group acquired by the optical emission spectrometer 1401. The horizontal axis represents the wafer identification number for identifying each unprocessed wafer 110 processed in the processing unit 120. The vertical axis represents the time length of the OES data measured by the optical emission spectrometer 1401 in association with the processing of each unprocessed wafer 110.

As illustrated in graph 1510, the OES data measured by the optical emission spectrometer 1401 may vary in time length from wafer to wafer with respect to the processed wafers.

In the example illustrated in FIG. 15, OES data 1520, for example, shows OES data measured in association with the processing of an unprocessed wafer having the wafer identification number "770". The vertical data size of the OES data 1520 depends on the range of wavelengths measured by the optical emission spectrometer 1401. In the second embodiment, the optical emission spectrometer 1401 measures emission intensity within a predetermined wavelength range, so that the vertical data size of the OES data 1520 is equal to the number of wavelengths "Nλ" included in the predetermined wavelength range, for example.

Further, the horizontal data size of the OES data 1520 depends on the time length of measurement by the optical emission spectrometer 1401. In the example illustrated in FIG. 15, the horizontal data size of the OES data 1520 is "LT".

In this manner, the OES data 1520 is acceptably regarded as a time series data group in which a plurality of one-dimensional data time series each having a predetermined time length for a respective wavelength are aggregated for a predetermined number of wavelengths.

When the OES data 1520 is input into the fifth network section 620_5 and the sixth network section 620_6, the branch section 610 resizes the data such that the data size becomes equal to that of the OES data having other wafer identification numbers in each mini-batch.

Specific Example of Processing in Normalization Part

In the following, specific examples will be described with respect to processing in the normalization parts of the fifth network section 620_5 and the sixth network section 620_6, into which the OES data 1520 is input by the branch section 610.

Figure 16:
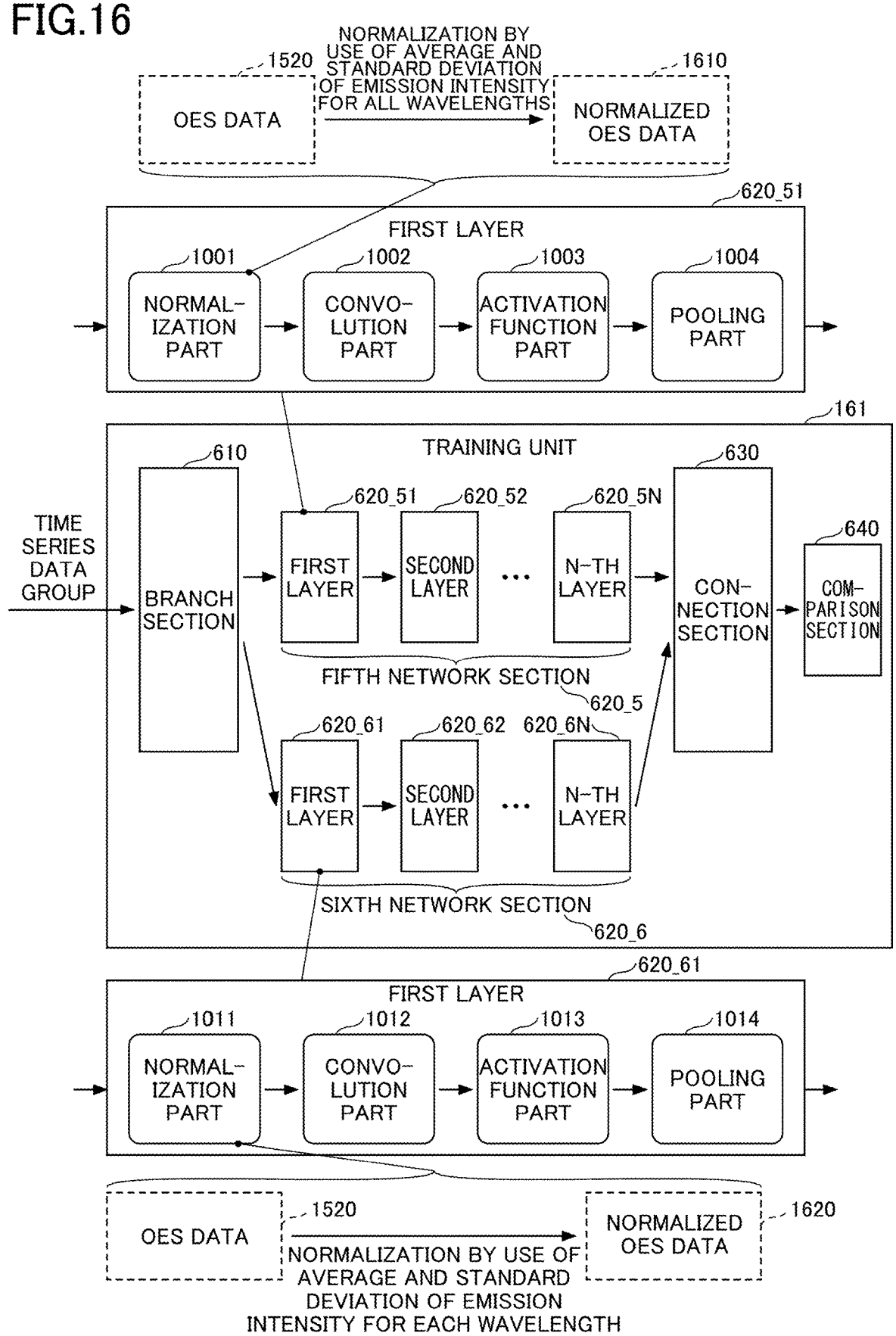
FIG. 16 is a drawing illustrating specific examples of processing in normalization parts included in the network sections into which OES data are input.

FIG. 16 is a drawing illustrating specific examples of processing in normalization parts included in the network sections into which OES data are input. As illustrated in FIG. 16, the first layer 620_51, among the layers included in the fifth network section 620_5, includes a normalization part 1001. The normalization part 1001 normalizes the OES data 1520 by use of a first algorithm (i.e., by use of maximum emission intensity) to generate normalized data (i.e., normalized OES data 1610).

As illustrated in FIG. 16, the first layer 620_61, among the layers included in the sixth network section 620_6, includes a normalization part 1011. The normalization part 1011 normalizes the OES data 1520 by use of a second algorithm (i.e., by use of maximum emission intensity on a wavelength-specific basis) to generate normalized data (i.e., normalized OES data 1620).

Figure 17:
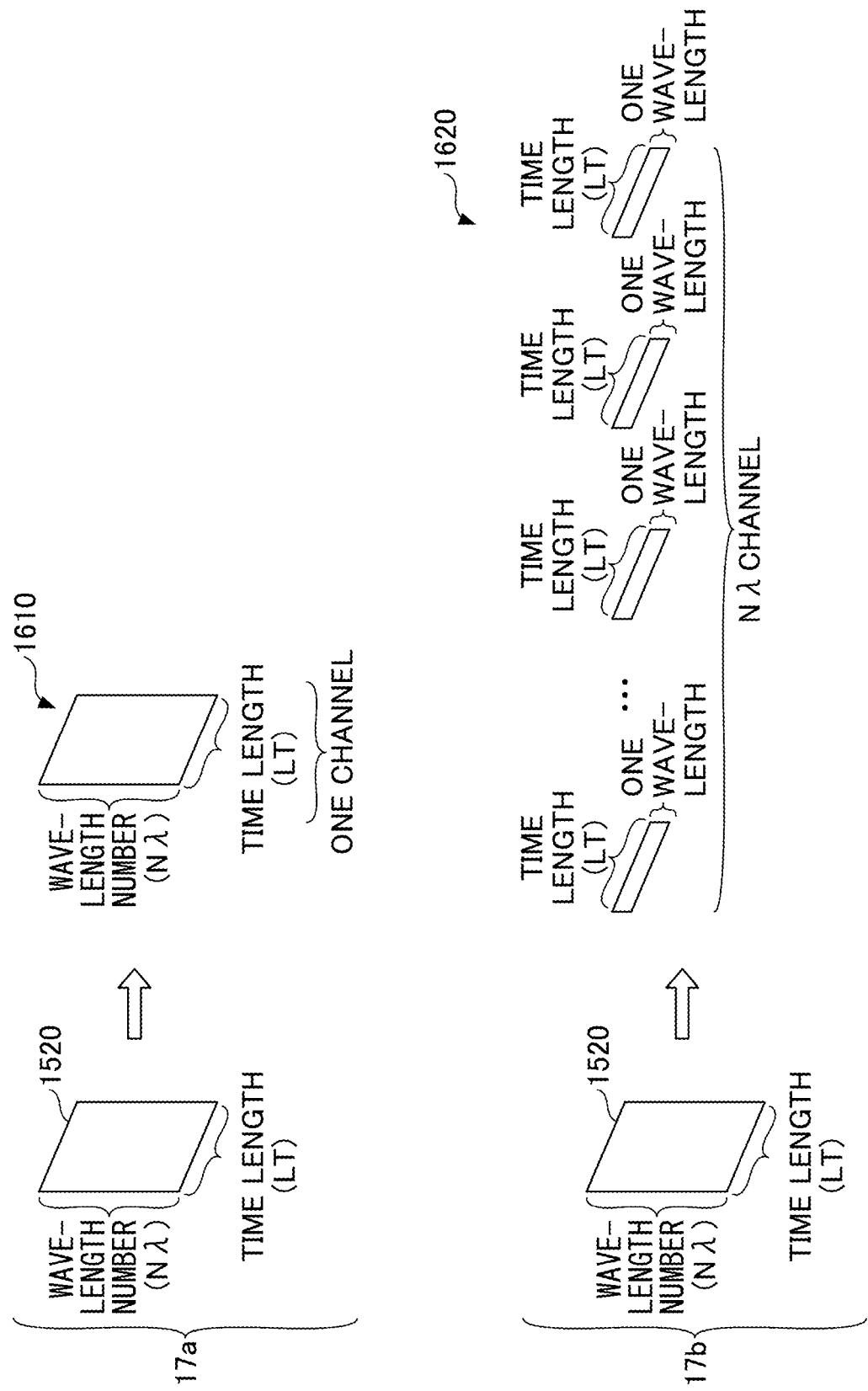
FIG. 17 is a drawing illustrating specific examples of processing by normalization parts.

FIG. 17 is a drawing illustrating specific examples of processing by the normalization parts. As indicated as 17a, the normalization part 1001 uses the first algorithm to generate one-channel normalized OES data 1610 with a data size equal to the wavelength number (NA) multiplied by the time length (LT) based on the resized OES data 1520.

Specifically, the normalization part 1001 calculates the average and standard deviation of emission intensities over the predetermined time length and over the entire wavelengths, and performs normalization by using the calculated values to generate the normalized OES data 1610. The first algorithm eliminates the absolute values of emission intensities, but retains relative emission intensities between wavelengths.

As indicated as 17b, the normalization part 1011 uses the second algorithm to generate Nλ-channel normalized OES data 1620 with a data size equal to the wavelength number (1) multiplied by the time length (LT) based on the resized OES data 1520.

Specifically, the normalization part 1011 calculates the average and standard deviation of emission intensities over the predetermined time length for each wavelength, and performs wavelength-specific normalization by using the calculated values to generate the normalized OES data 1620. The second algorithm retains relative emission intensities over the predetermined time length within the same wavelength.

In this manner, the same time series data presents different information to be seen, depending on what criterion is used to observe changes in emission intensity (i.e., depending on the method of analysis). In the virtual metrology apparatus 160 of the second embodiment, the same time series data group is processed by different network sections for respective, different normalization processes. Combining a plurality of normalization processes allows the time series data group in the processing unit 120 to be analyzed from different aspects. As a result, a model (i.e., inference unit 162) that achieves relatively high inference accuracy can be produced, compared with a configuration in which the OES data 1520 is processed by using a single network section to perform a single normalization process.

Specific Example of Processing in Pooling Part

Figure 18:
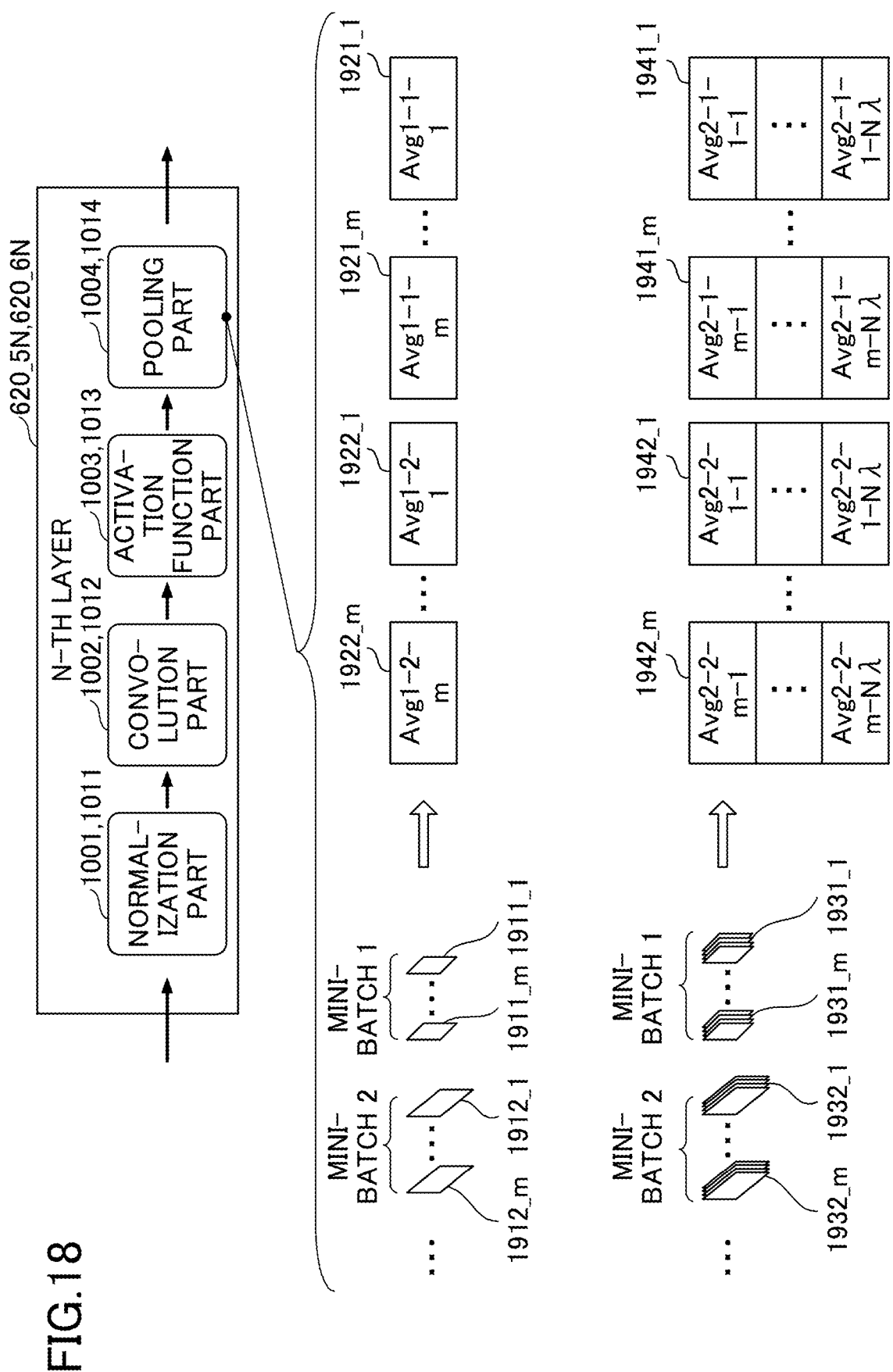
FIG. 18 is a drawing illustrating a specific example of processing by pooling parts.

In the following, a specific example will be described with respect to processing in the pooling parts included in the last layers of the fifth network section 620_5 and the sixth network section 620_6. FIG. 18 is a drawing illustrating a specific example of processing by the pooling parts.

As was previously described, OES data having different data sizes from wafer to wafer are resized into the same data size in each mini-batch by the branch section 610, followed by being input into the fifth network section 620_5 and the sixth network section 620_6.

In other words, the OES data input into the fifth network section 620_5 and the sixth network section 620_6 have different data sizes in different mini-batches.

In consideration of this, the pooling parts 1004 and 1014 included in the last layers (i.e., the N-th layer 620_5N and the N-th layer 620_6N) of the fifth network section 620_5 and the sixth network section 620_6 perform pooling such as to output constant-length data regardless of the mini-batch.

FIG. 18 is a drawing illustrating a specific example of processing by the pooling parts. As illustrated in FIG. 18, the pooling parts 1004 and 1014 perform GAP (global average pooling) on the feature data output from the activation function parts 1003 and 1013, respectively.

In FIG. 18, the feature data 1911_1 through 1911_m are the feature data input into the pooling part 1004 of the N-th layer 620_5N of the fifth network section 620_5, and corresponds to the feature data generated based on the OES data belonging to a mini-batch 1. The feature data 1911_1 through 1911_m each represent one-channel feature data.

In FIG. 18, the feature data 1912_1 through 1912_m are the feature data input into the pooling part 1004 of the N-th layer 620_5N of the fifth network section 620_5, and corresponds to the feature data generated based on the OES data belonging to a mini-batch 2. The feature data 1912_1 through 1912_m each represent feature data for one channel.

As is clearly seen in FIG. 18, the feature data 1911_1 through 1911_m and the feature data 1912_1 through 1912_m belong to different mini-batches, and thus have different data sizes.

Similarly, the feature data 1931_1 through 1931_m are the feature data input into the pooling part 1014 of the N-th layer 620_6N of the sixth network section 620_6, and corresponds to the feature data generated based on the OES data belonging to a mini-batch 1. The feature data 1931_1 through 1931_m each include feature data for Nλ channels.

Further, the feature data 1932_1 through 1932_m are the feature data input into the pooling part 1014 of the N-th layer 620_6N of the sixth network section 620_6, and corresponds to the feature data generated based on the OES data belonging to a mini-batch 2. The feature data 1932_1 through 1932_m each include feature data for Nλ channels.

As is clearly seen in FIG. 18, the feature data 1931_1 through 1931_m and the feature data 1932_1 through 1932_m belong to different mini-batches, and thus have different data sizes.

Here, the pooling parts 1004 and 1014 each calculate a channel-specific average of feature values included in the input feature data, thereby producing constant-length output data. With this arrangement, the data output from the pooling parts 1004 and 1014 suitably have the same data size across mini-batches.

For example, the pooling part 1004 of the N-th layer 620_5N of the fifth network section 620_5 calculates an average value Avg1-1-1 of the feature data 1911_1, thereby outputting output data 1921_1. Similarly, the pooling part 1004 of the N-th layer 620_5N of the fifth network section 620_5 calculates an average value Avg1-2-1 of the feature data 1912_1, thereby outputting output data 1922_1.

With this arrangement, the pooling part 1004, for example, can output the output data 1921_1 and the output data 1922_1 having a constant length with respect to the feature data 1911_1 and the feature data 1912_1 having different data sizes.

Similarly, the pooling part 1014 of the N-th layer 620_6N of the sixth network section 620_6 calculates channel-specific average values Avg2-1-1-through Avg2-1-1-Nλ with respect to the feature data 1931_1, thereby outputting output data 1941_1. Similarly, the pooling part 1014 of the N-th layer 620_6N of the sixth network section 620_6 calculates channel-specific average values Avg2-2-1-1 through Avg2-2-1-Nλ with respect to the feature data 1932_1, thereby outputting output data 1942_1.

With this arrangement, the pooling part 1014, for example, can output the output data 1941_1 and the output data 1942_1 having a constant length with respect to the feature data 1931_1 and the feature data 1932_1 having different data sizes.

Another Specific Example of Processing in Pooling Part

Figure 19:
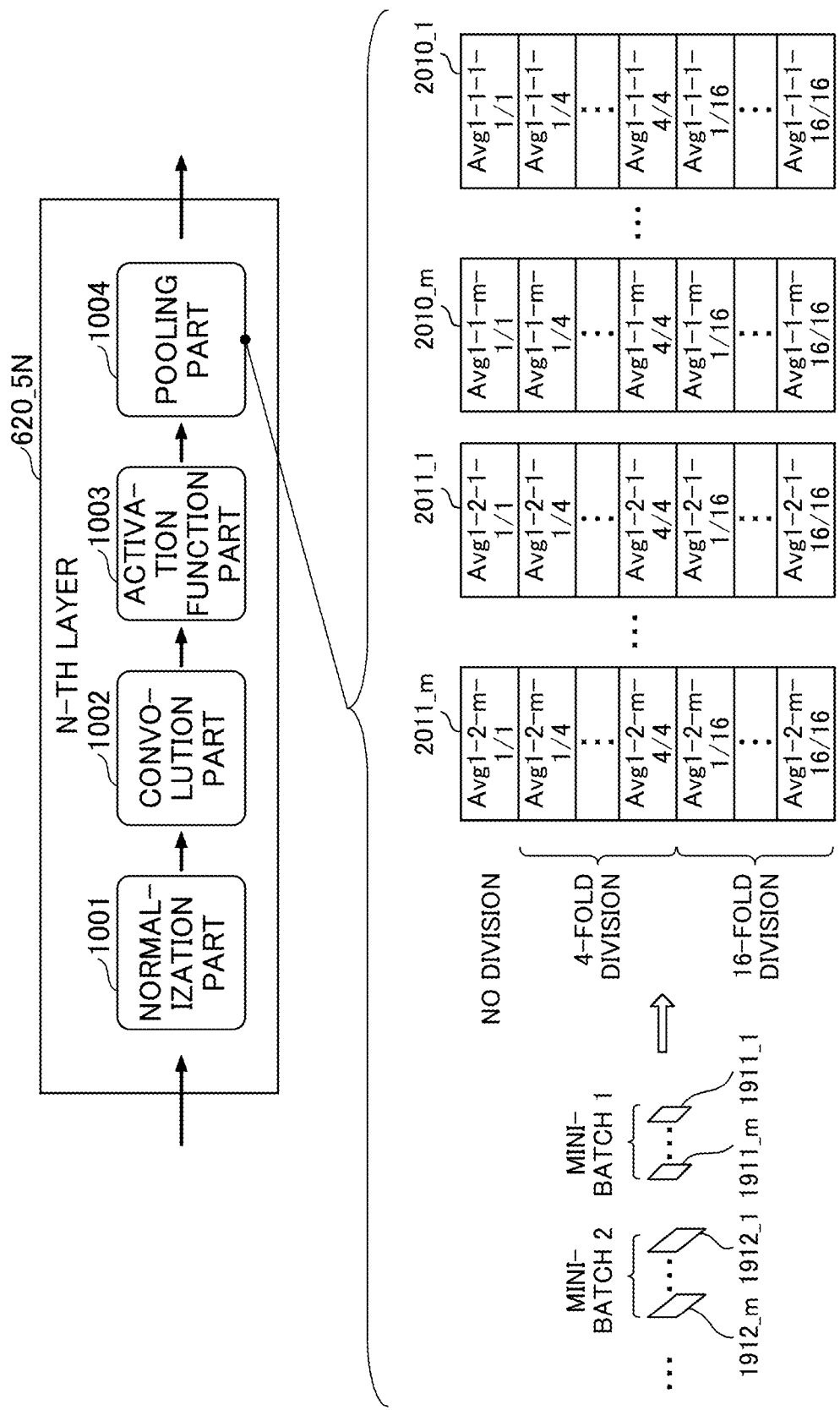
FIG. 19 is a drawing illustrating another specific example of processing by the pooling part included in the last layer of a fifth network section.

In the following, another specific example will be described with respect to processing in the pooling parts included in the last layers of the fifth network section 620_5 and the sixth network section 620_6. FIG. 19 is a drawing illustrating another specific example of processing by the pooling part included in the last layer of the fifth network section, and is a drawing used for explaining an SPP process.

As illustrated in FIG. 19, the pooling part 1004 calculates an average value of input feature data without dividing the data, and also calculates average values over respective areas by dividing the data into four or sixteen areas, thereby outputting constant-length output data responsive to the number of divisions.

For example, the pooling part 1004 of the N-th layer 620_5N of the fifth network section 620_5 calculates an average value Avg1-1-1-1/1 of the feature data 1911_1, without dividing the feature data 1911_1. Further, the pooling part 1004 of the N-th layer 620_5N of the fifth network section 620_5 divides the feature data 1911_1 into four areas, and calculates average values Avg1-1-1-1/4 through Avg1-1-1-4/4 over the respective areas. Moreover, the pooling part 1004 of the N-th layer 620_5N of the fifth network section 620_5 divides the feature data 1911_1 into sixteen areas, and calculates average values Avg1-1-1-1/16 through Avg1-1-1-16/16 over the respective areas.

The pooling part 1004 of the N-th layer 620_5N of the fifth network section 620_5 calculates an average value Avg1-2-1-1/1 of the feature data 1912_1, without dividing the feature data 1912_1. Further, the pooling part 1004 of the N-th layer 620_5N of the fifth network section 620_5 divides the feature data 1912_1 into four areas, and calculates average values Avg1-2-1-1/4 through Avg1-2-1-4/4 over the respective areas. Moreover, the pooling part 1004 of the N-th layer 620_5N of the fifth network section 620_5 divides the feature data 1912_1 into sixteen areas, and calculates average values Avg1-2-1-1/16 through Avg1-2-1-16/16 over the respective areas.

With this arrangement, the pooling part 1004, for example, can output the output data 2010_1 and the output data 2011_1 having a constant length with respect to the feature data 1911_1 and the feature data 1912_1 having different data sizes.

Figure 20:
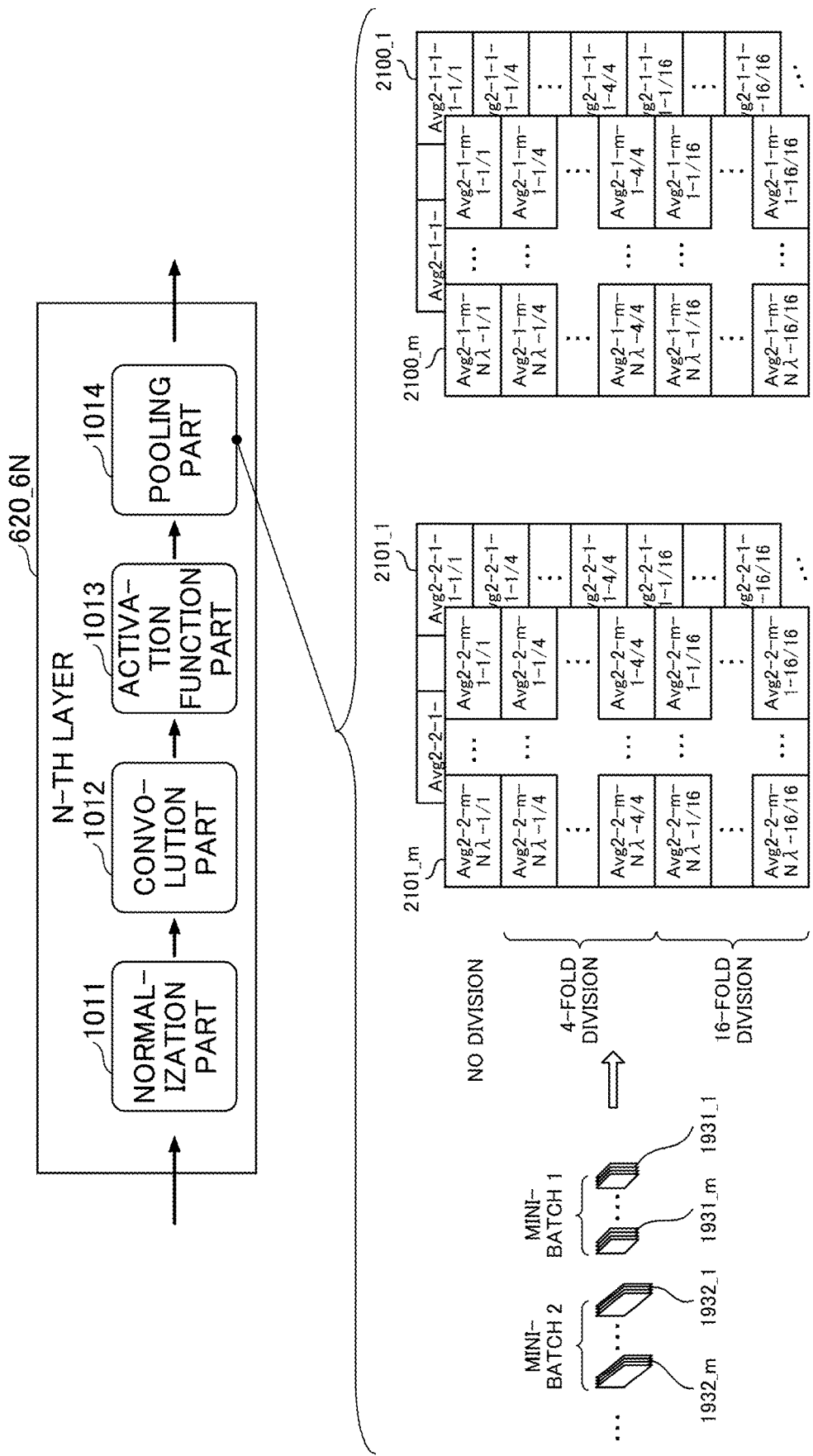
FIG. 20 is a drawing illustrating another specific example of processing by the pooling part included in the last layer of a sixth network section.

In the following, the details of the pooling part 1014 included in the N-th layer 620_6N of the sixth network section 620_6 will be described. FIG. 20 is a drawing illustrating another specific example of processing by the pooling part included in the last layer of the sixth network section, and is a drawing used for explaining an SPP process.

As illustrated in FIG. 20, the pooling part 1014 calculates an average value of channel-specific input feature data without dividing the data, and also calculates average values over respective areas by dividing the data into four or sixteen areas, thereby outputting constant-length output data responsive to the number of divisions.

For example, the pooling part 1014 of the N-th layer 620_6N of the sixth network section 620_6 calculates an average value Avg2-1-1-1-1/1 of the channel 1 of the feature data 1931_1, without dividing the channel 1 of the feature data 1931_1. Further, the pooling part 1014 of the N-th layer 620_6N of the sixth network section 620_6 divides the channel 1 of the feature data 1931_1 into four areas, and calculates average values Avg2-1-1-1-1/4 through Avg2-1-1-1-4/4 over the respective areas. Moreover, the pooling part 1014 of the N-th layer 620_6N of the sixth network section 620_6 divides the channel 1 of the feature data 1931_1 into sixteen areas, and calculates average values Avg2-1-1-1-1/16 through Avg2-1-1-1-16/16 over the respective areas.

The pooling part 1014 of the N-th layer 620_6N of the sixth network section 620_6 generates output data 2100_1 by performing the above-noted processes for each of the Nλ channels.

Similarly, the pooling part 1014 of the N-th layer 620_6N of the sixth network section 620_6 calculates an average value Avg2-2-1-1-1/1 of the channel 1 of the feature data 1932_1, without dividing the channel 1 of the feature data 1932_1. Further, the pooling part 1014 of the N-th layer 620_6N of the sixth network section 620_6 divides the channel 1 of the feature data 1932_1 into four areas, and calculates average values Avg2-2-1-1-1/4 through Avg2-2-1-1-4/4 over the respective areas. Moreover, the pooling part 1014 of the N-th layer 620_6N of the sixth network section 620_6 divides the channel 1 of the feature data 1932_1 into sixteen areas, and calculates average values Avg2-2-1-1-1/16 through Avg2-2-1-1-16/16 over the respective areas.

The pooling part 1014 of the N-th layer 620_6N of the sixth network section 620_6 generates output data 2101_1 by performing the above-noted processes for each of the Nλ channels.

With this arrangement, the pooling part 1014, for example, can output the output data 2100_1 and the output data 2101_1 having a constant length with respect to the feature data 1931_1 and the feature data 1932_1 having different data sizes.

<Evaluation of Virtual Metrology Data>

In the following, the accuracy of virtual metrology data (i.e., inferred outcomes) output from the inference unit 162 will be described. FIG. 21 is a first drawing for explaining the accuracy of outcomes inferred by the inference unit. The example illustrated in FIG. 21 illustrates comparison between virtual metrology data and inspection data with respect to each chamber (each of the four chambers from chamber A to chamber D) when one chamber is defined as the processing unit 120.

A description will be given here with respect to the case in which the inspection data are ER values. In each graph illustrated in FIG. 21, the horizontal axis represents the value of virtual metrology data, and the vertical axis represents the value of inspection data. Accordingly, the plotted points in each graph illustrated in FIG. 21 show that the closer they are to a straight line having a slope of "1", the greater the match between the values of the virtual metrology data and the values of the inspection data. Conversely, the plotted points show that the more they deviate from a straight line having a slope of "1", the greater the differences between the values of the virtual metrology data and the values of the inspection data.

What is illustrated as 21a is the plots showing relationships between
- ER values acquired by inspecting the processed wafer 130 after the unprocessed wafer 110 is processed in the chamber A serving as a processing unit, and
- the virtual metrology data inferred based on the OES data measured in association with the processing of the unprocessed wafer 110 in the chamber A serving as a processing unit.

What is illustrated as 21b is the plots showing relationships between
- ER values acquired by inspecting the processed wafer 130 after the unprocessed wafer 110 is processed in the chamber B serving as a processing unit, and
- the virtual metrology data inferred based on the OES data measured in association with the processing of the unprocessed wafer 110 in the chamber B serving as a processing unit.

What is illustrated as 21c is the plots showing relationships between
- ER values acquired by inspecting the processed wafer 130 after the unprocessed wafer 110 is processed in the chamber C serving as a processing unit, and
- the virtual metrology data inferred based on the OES data measured in association with the processing of the unprocessed wafer 110 in the chamber C serving as a processing unit.

What is illustrated as 21d is the plots showing relationships between
- ER values acquired by inspecting the processed wafer 130 after the unprocessed wafer 110 is processed in the chamber D serving as a processing unit, and
- the virtual metrology data inferred based on the OES data measured in association with the processing of the unprocessed wafer 110 in the chamber D serving as a processing unit.

As illustrated in 21a-21d, all the plots are situated close to the straight line having a slope of 1, which is acceptably considered to indicate that good results have been obtained regardless of the chamber. This means that the inference unit 162 is applicable to any chamber, so that there is no need to generate different models for different chambers as in the related art.

It may be noted that although the examples 21a-21d show the applicability of the inference unit 162 to any chambers, the inference unit 162 is also applicable to the same chamber regardless of whether before or after a maintenance. Namely, the inference unit 162 is free from the need for the maintenance of a model associated with the maintenance of a chamber as was required in the related art, thereby providing an advantage that the management cost of a model can be reduced.

Figure 22:
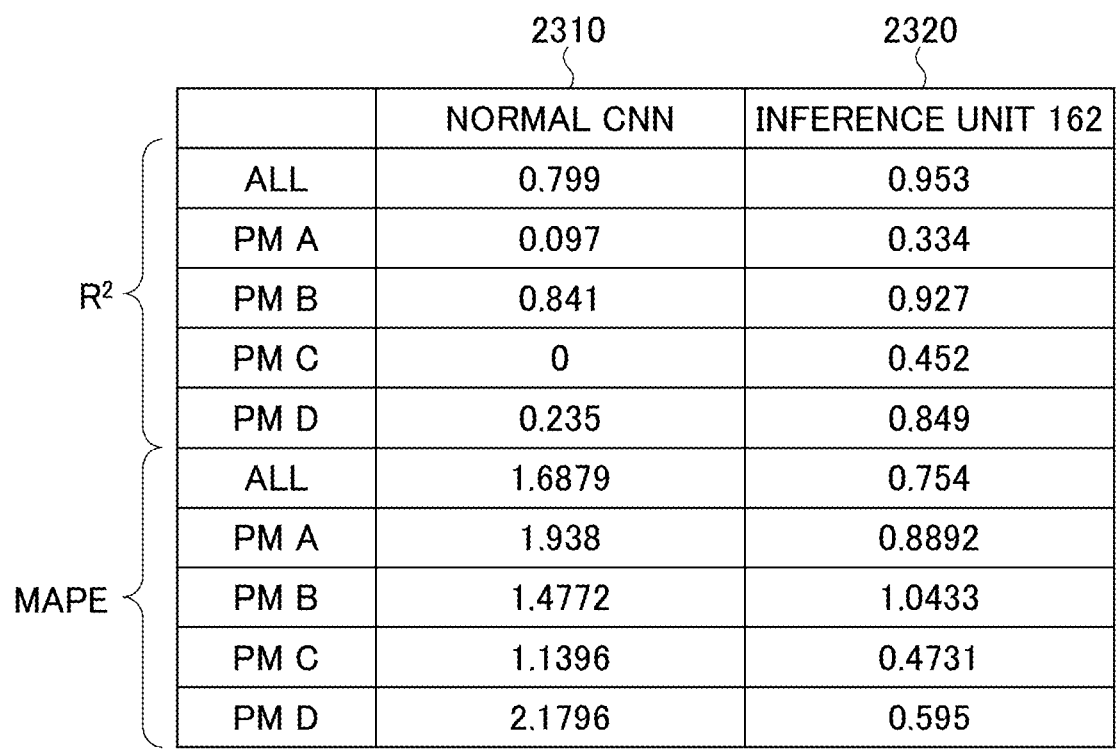
FIG. 22 is a second drawing for explaining the accuracy of outcomes inferred by the inference unit.

FIG. 22 is a second drawing for explaining the accuracy of outcomes inferred by the inference unit. In FIG. 22, reference numeral 2310 indicates evaluation values that are obtained by evaluating errors between virtual metrology data and inspection data when an inference is made by using an inference unit having a network section that is implemented as a normal convolutional neural network. Reference numeral 2320 indicates evaluation values that are obtained by evaluating errors between virtual metrology data and inspection data when an inference is made by using the inference unit 162.

In the example illustrated in FIG. 22, the square of a correlation coefficient (i.e., coefficient of determination) and the mean absolute percentage error (MAPE) are used as the evaluation values. Further, in the example illustrated in FIG. 22, evaluation values are calculated from the plots of all the chambers A through D serving as a processing unit, and are also calculated from plots of each of the chambers A through D serving as respective processing units.

As shown in FIG. 22, all the evaluation values exhibit more satisfactory results in the case of the inference unit 162 than in the case of an inference unit having a network section that is implemented as a normal convolutional neural network. Namely, the inference unit 162 is capable of performing a more accurate virtual metrology process than is the related-art configuration.

<Summary>

As is understood from the descriptions provided heretofore, the virtual metrology apparatus of the second embodiment is configured:
- to acquire time-series-data-group OES data measured by an optical emission spectrometer in association with the processing of a target object in a predetermined processing unit of a manufacturing process;

to normalize the acquired OES data by use of different algorithms, and to consolidate all the output data processed by respective, different network sections; and to train the different network sections by machine learning such that the consolidated result obtained by consolidating all the output data approaches inspection data (ER values) of the resultant object obtained by processing the target object in the predetermined processing unit of the manufacturing process.

In this manner, the OES data is configured for processing by the different network sections for machine learning, so that the predetermined processing unit of a manufacturing process can be analyzed from different aspects. As a result, a model that achieves relatively high inference accuracy can be produced, compared with a configuration in which OES data is processed by using a single network section.

Consequently, the second embodiment can provide a virtual metrology apparatus that is capable of performing a highly accurate virtual metrology process.

Further, the virtual metrology apparatus of the second embodiment is configured:

to resize the OES data input into separate network sections to generate OES data having the same data size within each mini-batch; and to perform GAP or SPP at the last layers of the network sections to ensure the same data size across the mini-batches, and to produce output data having a constant length.

With this arrangement, the second embodiment enables the generation of an inference unit based on a machine-learning algorithm even when OES data varying in length are input.

Other Embodiments

In the second embodiment described above, the illustrated examples of processing by the normalization part 1001 include:

normalization that is performed by using the average and standard deviation of emission intensities which are calculated with respect to emission intensities for a predetermined time length over the entire wavelengths; and normalization that is performed by using the average and standard deviation of emission intensities which are calculated with respect to emission intensities for a predetermined time length within each wavelength.

Notwithstanding this, various statistics may be used by the normalization part 1001 in performing normalization. For example, normalization may be performed by using the maximum value and standard deviation of emission intensities, or may be performed by using any other statistics. Further, the configuration may be such that a choice is given as to which statistics are used to perform normalization.

The second embodiment has been described with respect to a case in which the time series data group is OES data. However, the time series data group used in the second embodiment is not limited to OES data. A time series data group combining OES data and time series data other than OES data may alternatively be used.

The second embodiment has also been described with respect to the configuration in which the same time series data group is input into each of the different network sections. However, it does not matter whether the time series data groups input into respective, different network sections are the same time series data group or different time series data groups. The time series data groups may have partial overlaps with each other. This is because the inclusion of time series data having the same trend in separate time series data groups is supposed to bring about substantially the same effect.

The second embodiment has been described with respect to the configuration in which GAP or SPP is performed in the last layer of a network section. These processes may also be performed in the last layer of the network sections described in connection with the first embodiment.

The second embodiment has been described with reference to the configuration in which the feature data is divided by three types of methods of division (i.e., no division, 4-fold division, 16-fold division) when the pooling part 1014 performs SPP. It may be noted that the methods of division are not limited to three types. Further, the number of divisions is not limited to 0, 4, and 16.

The first and second embodiments have been described with respect to the configuration in which a machine-learning algorithm for the first network section 620_1 through the M-th network section 620_M of the training unit 161 is configured on the basis of a convolutional neural network. However, the machine-learning algorithm for the first network section 620_1 through the M-th network section 620_M of the training unit 161 is not limited to a convolutional neural network, and may be configured on the basis of any other machine-learning algorithm.

The second embodiment has been described with respect to the case in which ER values are used as the inspection data. Alternatively, CD (critical dimension) values or the like may be used.

The first and second embodiments have been described with respect to the configuration in which the virtual metrology apparatus 160 functions as the training unit 161 and the inference unit 162. However, the apparatus serving as the training unit 161 and the apparatus serving as the inference unit 162 need not be the same entity, and may be configured as separate entities. In other words, the virtual metrology apparatus 160 may function as the training unit 161 without having the inference unit 162, or may function as the inference unit 162 without having the training unit 161.

The present invention is not limited to the configurations described in connection with the embodiments that have been described heretofore, or to the combinations of these configurations with other elements. Various variations and modifications may be made without departing from the scope of the present invention, and may be adopted according to applications.

This application is based on and claims priority to Japanese Patent Application No. 2018-225676 filed on Nov. 30, 2018, and the entire contents of the Japanese Patent Application are incorporated herein by reference.

DESCRIPTION OF REFERENCE SYMBOLS

100: system
110: unprocessed wafer
120: processing unit
130: processed wafer
140_1 to 140_n: time series data acquisition apparatus
150: inspection data acquisition apparatus
160: virtual metrology apparatus
161: training unit
162: inference unit
200: semiconductor manufacturing apparatus
610: branch unit
620_1: first network section
620_11 to 620_1N: first layer to N-th layer 620_2: second network section
620_21 to 620_2N: first layer to N-th layer
620_M: M-th network section
620_M1 to 620_MN: first layer to N-th layer
630: connection section
640: comparison section
1001, 1011: normalization part
1004, 1014: pooling part
1210: branch unit
1220_1: first network section
1220_11 to 1220_1N: first layer to N-th layer
1220_2: second network section
1220_21 to 1220_2N: first layer to N-th layer
1220_M: M-th network section
1220_M1 to 1220_MN: first layer to N-th layer
1240: connection section
1250: comparison section
1410: optical emission spectrometer
1520: OES data
1610, 1620: normalized OES data

The invention claimed is:

1. A virtual metrology apparatus, comprising:
a memory; and
one or more processing circuits coupled to the memory and configured to:
acquire a time series data group measured in association with processing of a target object in a predetermined processing unit of a manufacturing process; and
cause a plurality of network sections to process the acquired time series data group, cause a connection section to consolidate output data produced by the plurality of network sections to generate virtual metrology data, and train the plurality of network sections and the connection section by machine learning, the machine learning ensuring that the virtual metrology data output from the connection section approaches inspection data measured from a resultant object obtained upon processing the target object in the predetermined processing unit of the manufacturing process,
wherein each of the plurality of network sections includes a plurality of layers, and processes the acquired time series data group in mini-batches, and
wherein a last layer of the plurality of layers includes a pooling part, and the pooling part performs a GAP (global average pooling) process for each of the mini-batches, thereby causing an output from each of the plurality of network sections for a given one of the mini-batches to be an average obtained for the given one of the mini-batches.

2. The virtual metrology apparatus as claimed in claim 1, wherein the one or more processing circuits are further configured to obtain, as inferred inspection data of a resultant object obtained upon processing a new target object, virtual metrology data output from the connection section, trained by machine learning, upon using the plurality of network sections trained by machine learning to process a time series data group acquired with respect to the new target object.

3. The virtual metrology apparatus as claimed in claim 1, wherein the one or more processing circuits are configured to train separate network sections, among the plurality of network sections, and the connection section by machine learning such that the virtual metrology data output from the connection section upon using the separate network sections respectively processing a first time series data group and a second time series data group approaches inspection data measured from the resultant object obtained upon processing the target object in the predetermined processing unit of the manufacturing process, the first time series data group and the second time series data group being generated by processing the acquired time series data group in accordance with a first criterion and a second criterion, respectively.

4. The virtual metrology apparatus as claimed in claim 3, wherein the one or more processing circuits are further configured to obtain, as inferred inspection data of a resultant object obtained upon processing a new target object, virtual metrology data output from the connection section, trained by machine learning, upon using the separate network sections trained by machine learning to respectively process a first time series data group and a second time series data group that are generated by processing a time series data group acquired from the new target object in accordance with the first criterion and the second criterion, respectively.

5. The virtual metrology apparatus as claimed in claim 1, wherein the one or more processing circuits are configured to train separate network sections, among the plurality of network sections, and the connection section by machine learning such that the virtual metrology data output from the connection section upon using the separate network sections to process respective groups approaches inspection data measured from the resultant object obtained upon processing the target object in the predetermined processing unit of the manufacturing process, the respective groups being obtained by dividing the acquired time series data group according to data types or time frames.

6. The virtual metrology apparatus as claimed in claim 5, wherein the one or more processing circuits are further configured to obtain, as inferred inspection data of a resultant object obtained upon processing a new target object, virtual metrology data output from the connection section, trained by machine learning, upon using the separate network sections trained by machine learning to process respective groups into which a time series data group acquired with respect to the new target object is divided according to the data types or the time frames.

7. The virtual metrology apparatus as claimed in claim 1, wherein the one or more processing units are configured to train separate network sections, among the plurality of network sections, and the connection section by machine learning such that the virtual metrology data output from the connection section upon using the separate network sections respectively processing a first time series data group and a second time series data group approaches inspection data measured from the resultant object obtained upon processing the target object in the predetermined processing unit of the manufacturing process, the first time series data group and the second time series data group being measured in association with processing of the target object in a first processing space and measured in association with processing of the target object in a second processing space, respectively, in the predetermined processing unit.

8. The virtual metrology apparatus as claimed in claim 7, wherein the one or more processing circuits are further configured to obtain, as inferred inspection data of a resultant object obtained upon processing a new target object, virtual metrology data output from the connection section, trained by machine learning, upon using the separate network sections trained by machine learning to respectively process a first time series data group and a second time series data group that are measured in association with processing of the new target object in a first processing space and measured in association with processing of the new target object in a second processing space, respectively, in a predetermined processing unit.

9. The virtual metrology apparatus as claimed in claim 1, wherein the time series data group is data measured in association with processing in a substrate processing apparatus.

10. The virtual metrology apparatus as claimed in claim 1, wherein each of the plurality of network sections outputs output data having a same data size to the connection section regardless of a data size of the mini-batches.

11. The virtual metrology apparatus as claimed in claim 1, wherein the one or more processing circuits are configured to train, by machine learning, the connection section and different network sections, among the plurality of network sections, including respective normalization parts that perform normalization based on respective, different algorithms, such that the virtual metrology data output from the connection section upon using the different network sections processing the acquired time series data group approaches inspection data measured from the resultant object obtained upon processing the target object in the predetermined processing unit of the manufacturing process.

12. The virtual metrology apparatus as claimed in claim 11, wherein the one or more processing circuits are further configured to obtain, as inferred inspection data of a resultant object obtained upon processing a new target object, virtual metrology data output from the connection section, trained by machine learning, upon using the different network sections trained by machine learning to process a time series data group acquired with respect to the new target object.

13. The virtual metrology apparatus as claimed in claim 11, wherein the time series data group is data measured by an optical emission spectrometer in association with processing in a substrate processing apparatus, and is data indicating emission intensity of each of multiple wavelengths measured at each of multiple times.

14. The virtual metrology apparatus as claimed in claim 13, wherein one of the normalization parts included in a first network section among the different network sections generates, based on the time series data group, one-channel data indicating emission intensity for a predetermined time length for relevant wavelengths, and normalizes the generated one-channel data.

15. The virtual metrology apparatus as claimed in claim 13, wherein one of the normalization parts included in a second network section among the different network sections generates, based on the time series data group, channels of data equal in number to a number of wavelengths and each indicating emission intensity in a predetermined time length for a respective wavelength, and normalizes each of the generated channels of data.

16. A virtual metrology apparatus, comprising:
a memory; and
one or more processing circuits coupled to the memory and configured to:
acquire a time series data group measured in association with processing of a first target object in a predetermined processing unit of a manufacturing process; and
cause a plurality of network sections to process the acquired time series data group, cause a connection section to consolidate output data produced by the plurality of network sections, and obtain, as inferred inspection data of a resultant object obtained upon processing the first target object, virtual metrology data output from the connection section,
wherein the plurality of network sections and the connection section are trained by machine learning, the machine learning ensuring that virtual metrology data output from the connection section upon using the plurality of network sections to process a time series data group acquired in advance approaches inspection data measured from a resultant object obtained upon processing a second target object in a predetermined processing unit of a manufacturing process,
wherein each of the plurality of network sections includes a plurality of layers, and processes the acquired time series data group in mini-batches, and
wherein a last layer of the plurality of layers includes a pooling part, and the pooling part performs a GAP (global average pooling) process for each of the mini-batches, thereby causing an output from each of the plurality of network sections for a given one of the mini-batches to be an average obtained for the given one of the mini-batches.

17. A virtual metrology method, comprising:
acquiring a time series data group measured in association with processing of a target object in a predetermined processing unit of a manufacturing process; and
training, in a training unit including a plurality of network sections configured to process the acquired time series data group and a connection section configured to consolidate output data produced by the plurality of network sections to generate virtual metrology data, the plurality of network sections and the connection section by machine learning, the machine learning ensuring that the virtual metrology data output from the connection section approaches inspection data measured from a resultant object obtained upon processing the target object in the predetermined processing unit of the manufacturing process,
wherein each of the plurality of network sections includes a plurality of layers, and processes the acquired time series data group in mini-batches, and
wherein a last layer of the plurality of layers includes a pooling part, and the pooling part performs a GAP (global average pooling) process for each of the mini-batches, thereby causing an output from each of the plurality of network sections for a given one of the mini-batches to be an average obtained for the given one of the mini-batches.

18. A non-transitory recording medium having a program embodied therein for causing a computer to perform the virtual metrology method of claim 17.

* * * * *